United States Patent
Stockl et al.

(10) Patent No.: US 6,417,267 B1
(45) Date of Patent: Jul. 9, 2002

(54) ADHESIVE COMPOSITIONS CONTAINING STABLE AMINO-CONTAINING POLYMER LATEX BLENDS

(75) Inventors: Rebecca R. Stockl, Kingsport; Martha J. Collins, Blountville, both of TN (US); James W. Taylor, Gurnee, IL (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/576,639

(22) Filed: May 24, 2000

Related U.S. Application Data

(63) Continuation-in-part of application No. 09/455,496, filed on Dec. 6, 1999, now abandoned, which is a continuation of application No. 08/861,431, filed on May 21, 1997, now Pat. No. 5,998,543.
(60) Provisional application No. 60/018,423, filed on May 28, 1996, provisional application No. 60/018,424, filed on May 28, 1996, and provisional application No. 60/028,444, filed on Oct. 10, 1996.

(51) Int. Cl.$^7$ ............................ C08L 39/00; C08L 57/00
(52) U.S. Cl. ...................... 524/808; 524/501; 524/800; 524/839; 524/845; 524/846; 427/393.5; 427/388.2; 427/388.4; 427/385.5; 523/201
(58) Field of Search ................................ 524/800, 808, 524/839, 845, 846, 501; 427/393.5, 388.2, 385.5, 388.4; 523/201

(56) References Cited

U.S. PATENT DOCUMENTS

| | | |
|---|---|---|
| 3,113,038 A | 12/1963 | Lattarulo et al. ............ 117/140 |
| 3,261,796 A | 7/1966 | Simms |
| 3,261,797 A | 7/1966 | McDowell et al. ......... 260/29.6 |
| 3,290,417 A | 12/1966 | Christenson et al. ....... 260/901 |
| 3,325,443 A | 6/1967 | Christenson et al. ......... 260/41 |
| 3,356,627 A | 12/1967 | Scott .......................... 260/29.6 |
| 3,386,939 A | 6/1968 | Mesee et al. ............... 260/29.3 |
| 3,483,149 A | 12/1969 | Gresenz et al. ................ 260/18 |
| 3,553,116 A | 1/1971 | Kaplan et al. ................. 260/17 |
| 3,607,834 A | 9/1971 | Marx et al. ................. 260/63 R |
| 3,639,327 A | 2/1972 | Drelich ................ 260/29.6 NR |
| 3,678,013 A | 7/1972 | Sherwood et al. ..... 260/77.5 R |
| 3,679,564 A | 7/1972 | Dowbenko et al. .......... 204/181 |
| 3,725,124 A | 4/1973 | Gorton et al. ..... 117/138.8 UA |
| 3,876,596 A | 4/1975 | Grubert et al. |
| 3,927,206 A | 12/1975 | Blank et al. .................... 424/81 |
| 4,032,482 A | 6/1977 | Moriya ........................... 260/2 |
| 4,136,067 A | 1/1979 | Reed et al. .................... 521/32 |
| 4,158,725 A | 6/1979 | Nishimura et al. ......... 526/52.1 |
| 4,210,565 A | 7/1980 | Emmons et al. ...... 260/29.6 TA |
| 4,239,893 A | 12/1980 | Pigerol et al. ............... 546/321 |
| 4,241,682 A | 12/1980 | Konstandt ................. 114/67 R |
| 4,244,850 A | 1/1981 | Mylonakis ............ 260/29.6 M |
| 4,535,128 A | 8/1985 | Umemoto et al. .......... 525/162 |
| 4,540,739 A | 9/1985 | Midgley ...................... 524/764 |
| 4,634,544 A | 1/1987 | Weber .......................... 252/95 |

(List continued on next page.)

FOREIGN PATENT DOCUMENTS

| | | |
|---|---|---|
| DE | 2535372 | 2/1977 |
| DE | 3713511 | 12/1987 |
| EP | 0 271 033 | 6/1988 |
| EP | 341886 | 11/1989 |
| EP | 358358 | 3/1990 |
| EP | 390370 | 10/1990 |
| EP | 483915 | 5/1992 |
| EP | 0 492 847 A2 | 7/1992 |
| EP | 0 502 573 | 9/1992 |
| EP | 0 552 469 A2 | 7/1993 |
| EP | 555774 | 8/1993 |
| EP | 0 573 142 A1 | 12/1993 |
| EP | 705855 | 4/1996 |
| GB | 1151479 | 5/1969 |
| GB | 1155275 A | 6/1969 |
| JP | 61-21171 | 1/1986 |

(List continued on next page.)

OTHER PUBLICATIONS

Derwent Abstract of JP03020302, Jan. 29, 1991.
Derwent Abstract of JP60127376, Jul. 8, 1985.
D. Horn, "Polyethylenimine–Physicochemical Properties and Applications," reprinted from "(IUPAC) Polymeric Amines and Ammonium Salts," pp. 333, and 345–351, 1980.
Nishihata et al., "Formation and Hydrolysis of Enamine in Aqueous Solution" Chem. Pharm. Bull., pp. 4545–4550, Jan. 26, 1984.
Rector et al., "Applications for the Acetoacetyl Functionality in Thermoset Coatings," Water–Borne and Higher Solid Coating Symposium, Feb. 3, 1988.
Lee et al., "Effect of Surfactants and Polymerization Methods On The Morphology of Particles Formed in 'Core–Shell' Emulsion Polymerization of Methyl Methacrylate and Styrene" Makromol. Chem., Sep. 8, 1989, pp. 655–661.

(List continued on next page.)

*Primary Examiner*—Peter Szekely
(74) *Attorney, Agent, or Firm*—Bernard J. Graves, Esq.

(57) ABSTRACT

This invention provides the composition, preparation, and end-use of waterborne crosslinking technology based compositions prepared from water-based latexes. The invention provides a water-based latex comprising dispersed, waterborne amino-functional polymer particles; dispersed, waterborne acetoacetoxy-functional polymer particles; and water. In a preferred embodiment, a latex of the invention comprises dispersed, waterborne polymeric (polyamino) enamine (PPAE) particles; dispersed, waterborne acetoacetoxy-functional polymer particles; and water. The PPAE is the reaction product of a surfactant-stabilized acetoacetoxy-functional polymer (SAAP) and a poly (alkylenimine). The water-based latexes of the invention provide stable emulsions containing a blend of waterborne polymer particles which undergo crosslinking upon film formation. The latex films or coatings may be cured at ambient temperatures or may be thermally cured. The latex is useful in variety of adhesive formulations such as pressure sensitive adhesives, laminating adhesives, and the like.

21 Claims, No Drawings

U.S. PATENT DOCUMENTS

| | | | |
|---|---|---|---|
| 4,678,606 A | 7/1987 | Akhter | 252/542 |
| 4,759,983 A | 7/1988 | Knutson et al. | 428/343 |
| 4,812,541 A | 3/1989 | Mallya et al. | 526/264 |
| 4,820,863 A | 4/1989 | Taylor | 560/115 |
| 4,839,413 A | 6/1989 | Kiehlbauch et al. | |
| 4,855,349 A | 8/1989 | Ingle | 524/432 |
| 4,906,684 A | 3/1990 | Say | 524/548 |
| 4,908,229 A | 3/1990 | Kissel | 427/54.1 |
| 4,908,403 A | 3/1990 | Spada et al. | 524/818 |
| 4,927,876 A | 5/1990 | Coogan et al. | |
| 4,939,233 A | 7/1990 | Jenkins et al. | |
| 4,946,932 A | 8/1990 | Jenkins | |
| 4,980,404 A | 12/1990 | Aydin et al. | 524/100 |
| 4,987,186 A | 1/1991 | Akiyama et al. | 525/107 |
| 4,988,762 A | 1/1991 | Overbeek et al. | 524/839 |
| 5,002,680 A | 3/1991 | Schmidt | 252/90 |
| 5,002,998 A | 3/1991 | Carey et al. | 524/555 |
| 5,021,469 A | 6/1991 | Langerbeins et al. | 523/201 |
| 5,049,416 A | 9/1991 | Wilczynski | 427/208.4 |
| 5,053,441 A | 10/1991 | Biale | 523/201 |
| 5,053,452 A | 10/1991 | Spada et al. | 524/707 |
| 5,055,506 A | 10/1991 | Knutson | 524/100 |
| 5,073,445 A | 12/1991 | Ingle | 428/314.4 |
| 5,100,969 A | 3/1992 | Yamamoto et al. | 525/327.3 |
| 5,108,575 A | 4/1992 | Chung et al. | 204/181.7 |
| 5,122,567 A | 6/1992 | Spada et al. | 524/818 |
| 5,137,961 A | 8/1992 | Goos et al. | |
| 5,164,444 A | 11/1992 | Bernard | 524/833 |
| 5,183,459 A | 2/1993 | Bernard | 602/52 |
| 5,185,212 A | 2/1993 | Spada et al. | 428/483 |
| 5,185,397 A | 2/1993 | Biale | 524/820 |
| 5,189,126 A | 2/1993 | Bernard | 526/261 |
| 5,202,375 A | 4/1993 | Biale | 524/562 |
| 5,227,413 A | 7/1993 | Mitra | 523/116 |
| 5,242,978 A | 9/1993 | Muller et al. | 525/102 |
| 5,244,963 A | 9/1993 | Biale | 524/555 |
| 5,246,984 A | 9/1993 | Darwen et al. | 523/404 |
| 5,247,040 A | 9/1993 | Amick et al. | 526/286 |
| 5,264,467 A | 11/1993 | DiStefano | 523/218 |
| 5,264,532 A | 11/1993 | Bernard | 526/261 |
| 5,270,380 A | 12/1993 | Adamson et al. | 524/556 |
| 5,277,978 A | 1/1994 | Feustel et al. | 428/402 |
| 5,278,227 A | 1/1994 | Bernard | 524/817 |
| 5,296,159 A | 3/1994 | Wilson | 252/117 |
| 5,296,530 A | 3/1994 | Bors et al. | 524/558 |
| 5,308,890 A | 5/1994 | Snyder | 523/201 |
| 5,344,675 A | 9/1994 | Snyder | 427/388.4 |
| 5,349,026 A | 9/1994 | Emmons et al. | 525/328.6 |
| 5,362,816 A | 11/1994 | Snyder et al. | 525/329.9 |
| 5,364,891 A | 11/1994 | Pears et al. | 522/149 |
| 5,371,148 A | 12/1994 | Taylor et al. | 525/293 |
| 5,391,624 A | 2/1995 | Rasoul et al. | 525/216 |
| 5,414,041 A | 5/1995 | Larson et al. | 524/589 |
| 5,426,129 A | 6/1995 | Emmons et al. | 522/6 |
| 5,435,879 A | 7/1995 | Knutson et al. | 156/327 |
| 5,484,849 A | 1/1996 | Bors et al. | 525/167.5 |
| 5,484,975 A | 1/1996 | Itatsu | 219/86.7 |
| 5,494,961 A | 2/1996 | Lavoie et al. | 525/102 |
| 5,494,975 A | 2/1996 | Lavoie et al. | 525/928.6 |
| 5,498,659 A | 3/1996 | Esser | 524/549 |
| 5,525,662 A | 6/1996 | Lavoie et al. | 524/558 |
| 5,534,310 A | 7/1996 | Rokowski et al. | 427/494 |
| 5,539,073 A | 7/1996 | Taylor et al. | 524/553 |
| 5,541,251 A | 7/1996 | Bontinck et al. | 524/507 |
| 5,548,024 A | 8/1996 | Lavoie et al. | 525/102 |
| 5,559,192 A | 9/1996 | Bors et al. | 525/300 |
| 5,562,953 A | 10/1996 | Bors et al. | 427/558 |
| 5,605,722 A | 2/1997 | Esser | 427/388.4 |
| 5,605,952 A | 2/1997 | Esser | 524/522 |
| 5,605,953 A | 2/1997 | Esser | 524/522 |
| 5,609,965 A | 3/1997 | Esser | 428/522 |
| 5,616,764 A | 4/1997 | Lavoie et al. | 556/482 |
| 5,661,212 A | 8/1997 | Lear et al. | 524/555 |
| 5,672,379 A | 9/1997 | Schall et al. | 427/137 |
| 5,674,511 A | 10/1997 | Kacher | 424/401 |
| 5,741,543 A | 4/1998 | Winslow et al. | 427/208.4 |
| 5,763,546 A | 6/1998 | Jung et al. | 525/313 |
| 5,767,199 A | 6/1998 | Bors et al. | 525/153 |
| 5,783,626 A | 7/1998 | Taylor et al. | 524/555 |
| 5,821,294 A | 10/1998 | Perlinski | |
| 5,869,590 A * | 2/1999 | Clark et al. | 524/543 |
| 5,891,950 A | 4/1999 | Collins et al. | |
| 5,922,790 A * | 7/1999 | Atkins | 524/285 |
| 5,932,350 A * | 8/1999 | Lauer et al. | 428/411.1 |
| 5,939,482 A | 8/1999 | Kreissmann et al. | 524/460 |
| 5,962,556 A * | 10/1999 | Taylor | 524/832 |
| 5,990,224 A | 11/1999 | Raynolds et al. | 524/501 |
| 5,998,543 A | 12/1999 | Collins et al. | 524/808 |
| 6,005,035 A | 12/1999 | Raynolds et al. | 524/253 |
| 6,028,155 A * | 2/2000 | Collins et al. | 526/270 |
| 6,090,882 A * | 7/2000 | Trumbo et al. | 524/555 |
| 6,117,492 A * | 9/2000 | Goldstein et al. | 427/391 |
| 6,201,048 B1 * | 3/2001 | Raynolds et al. | 524/147 |

FOREIGN PATENT DOCUMENTS

| | | |
|---|---|---|
| JP | 1-229242 | 9/1989 |
| JP | 3-6236 | 1/1991 |
| JP | 4-189874 | 7/1992 |
| JP | 6-121171 | 4/1994 |
| JP | 11-323059 | 11/1999 |
| WO | WO 91/14715 | 10/1991 |
| WO | WO 95/00573 | 1/1995 |
| WO | WO95/09209 | 4/1995 |
| WO | WO 96/16998 | 6/1996 |
| WO | WO96/32424 A2 | 10/1996 |
| WO | WO 97 45468 | 12/1997 |
| WO | WO 97/45490 | 12/1997 |
| WO | WO 97/45495 | 12/1997 |
| WO | WO 99/14275 | 3/1999 |
| WO | WO 99/14278 | 3/1999 |

OTHER PUBLICATIONS

"For Your Unlimited Imagination: Polymin (Polyethylenimine)" 1992 BASF Corporation.

Moszner et al., "Reaction behaviour of monomeric β–ketoesters" Polymer Bulletin 32, 1994, pp. 419–426.

Keith M. Moody, "Waterborne Acrylic Emulsion Using AAEM" Technical Tips, Eastman Kodak Company Sep. 1, 1995.

Geruink et al., "Analytical aspects and film properties of two–pack acetoacetate functional latexes," *Progress in Organic Coatings*, vol. 27, Jan.–Apr. 1996, pp. 73–78.

Kirk–Othmer, "Encyclopedia of Chemical Technology", Wiley–Interscience, New York, XP002091794, 3rd. ed., "Emulsion", vol. 8, pp. 900–915.

Smith et al., "New Vinyl Ester Monomers for Emulsion Polymers," Progress in Organic Coatings 22, 1993, pp. 19–25.

William C. Griffin, "Calculation of HLB Values of Non–Ionic Surfactants," Journal of the Society of Cosmetic Chemists, pp. 249–256, XP 000671451.

R. Heusch, "Eine experimentelle Methode zur Bestimmung des HLB–Wertes von Tensiden," Kolloid–Zeitschrift & Zeitschrift für Polymere, Darmstadt BRD, pp. 31–37, Band 236–238, 1970.

* cited by examiner

ADHESIVE COMPOSITIONS CONTAINING STABLE AMINO-CONTAINING POLYMER LATEX BLENDS

This application is a continuation-in-part of copending U.S. patent application Ser. No. 09/455,496, filed Dec. 6, 1999, now abandoned, which is a continuation of U.S. patent application Ser. No. 08/861,431 filed May 21, 1997, now U.S. Pat. No. 5,998,543, which claims benefit of Provisional Application Nos. 60/018,423 filed May 28, 1996, 60/018,424 filed May 28, 1996, and 60/028,444 filed Oct. 10, 1996, the disclosures of which are herein incorporated by reference.

FIELD OF THE INVENTION

This invention belongs to the field of emulsion chemistry. In particular, it relates to a blend of different waterborne polymers which are useful in a variety of adhesive formulations.

BACKGROUND OF THE INVENTION

In an increasing number of industries, aqueous coating compositions continue to replace traditional organic solvent-based coating compositions, as the use of solvents other than water is becoming more and more undesirable due to solvent expense and the cost and hazards involved in controlling solvent vapors. Paints, inks, sealants, and adhesives such as pressure sensitive or laminating adhesives, for example, previously formulated with organic solvents, are now formulated as aqueous compositions. This reduces potentially harmful exposure to volatile organic compounds (VOC's) commonly found in solvent-based compositions. While the move from organic solvent-based to aqueous compositions brings health and safety benefits, loss of one or more physical properties may often result from substitution of waterborne latexes or hot melts for solvent-based polymer systems. Accordingly, the aqueous coating compositions must meet or exceed the performance standards expected from solvent-based compositions. The need to meet or exceed such performance standards places a premium on the characteristics and properties of waterborne polymer compositions used in aqueous coating compositions, such as adhesives.

Waterborne polymers having various functional groups have been used to impart and achieve desired properties to a particular coating composition. For example, a coating composition should exhibit good film formation, print and block resistance, as well as adhesion and tensile properties. Polymers having acetoacetoxy- and enamine-functional groups represent one example of waterborne polymers which have such properties, may carry different functional groups, and are useful in aqueous coating compositions.

For example, U.S. Pat. No. 5,296,530 discloses a quick-curing coating prepared from a polymer having acetoacetyl groups, in which substantially all of the acetoacetyl groups have been converted to enamine functional groups. This conversion occurs, for example, by treatment with ammonia or a primary amine. Coatings so prepared cure more quickly under sunlight or ultraviolet light than coatings which contain the acetoacetyl functional polymer but which have not been converted to an enamine form.

U.S. Pat. Nos. 5,484,975 and 5,525,662 describe the preparation of polymers containing functional acetoacetate groups and then, following the polymerization, reacting the acetoacetate group with a functional amine to form an enamine. The resulting polymers are reported to have a variety of uses including coatings, sealants, adhesives, and saturant applications.

U.S. Pat. No. 5,498,659 discloses polymeric formulations comprising an aqueous carrier, at least one polymeric ingredient, a non-polymeric polyfunctional amine, and a base. The polymeric ingredient has both acid-functional and acetoacetoxy-type functional moieties. The aqueous polymeric formulations produce crosslinked polymeric surface coatings on a substrate.

Japanese Patent Application No. 61-21171 describes a fast-curing adhesive of two separate liquids. The first liquid is an aqueous solution and/or aqueous emulsion of a polymer compound containing an acetoacetyl group. The second liquid consists of polyethylenimine. However, according to this disclosure, in order to achieve fast-curing adhesive properties, the adhesive must be applied as two separate liquids.

U.S. Pat. No. 5,362,816 describes a pressure-sensitive adhesive containing an acetoacetate functional monomer in a low Tg emulsion polymer. The pressure sensitive adhesive is a polymer prepared by free radical emulsion polymerization having a Tg below about 0° C. and has pendent acetoacetate functional groups. The pendent acetoacetate groups are reacted with ammonia or a primary amine to form an enamine-containing composition at a pH greater than 9.

U.S. Pat. No. 5,278,227 describes inherently tacky, emulsion pressure-sensitive adhesive polymers prepared from a specified mixture of monomers. The monomer mixture comprises about 35 to about 65 percent by weight alkyl acrylates, about 15 to about 35 percent vinyl esters, about 20 to about 35 percent by weight diesters of a dicarboxylic acid, and up to about 5 percent by weight of an unsaturated carboxylic acid. The glass transition temperature of the polymer is less than about −30° C.

Even with current waterborne polymer formulations, a need remains for improved aqueous adhesive compositions and waterborne polymers for use in those compositions. In particular, a need exists for stable waterborne polymer compositions which may formulate as a single, stable composition. The present invention meets such needs.

SUMMARY OF THE INVENTION

This invention provides a water-based latex comprising dispersed, waterborne amino-functional polymer particles; dispersed, waterborne acetoacetoxy-functional polymer particles; and water. In a preferred embodiment, a latex of the invention comprises dispersed, waterborne polymeric (polyamino)enamine (PPAE) particles; dispersed, waterborne acetoacetoxy-functional polymer particles; and water. The PPAE is the reaction product of a surfactant-stabilized acetoacetoxy-functional polymer (SAAP) and a poly (alkylenimine). The water-based latexes of the invention provide stable emulsions containing a blend of waterborne polymer particles which undergo crosslinking upon film formation. The latex films or coatings may be cured at ambient temperatures or may be thermally cured. The latex is useful in a variety of coating compositions such as, for example, paints, inks, sealants, and adhesives.

The water-based latexes according to the invention have beneficial adhesive and shear strength properties. Particularly suitable adhesive compositions comprise a mixture of (a) the water-based latex discussed above and (b) a non-acetoacetoxy functional polymer. In this embodiment, the amino-functional polymer particles and the acetoacetoxy-functional polymer particles of water-based latex (a) have a glass transition temperature (Tg) of greater than about 0° C.

and the non-acetoacetoxy functional polymer (b) has a Tg of from about 20° C. or lower.

Indeed, it has been discovered that the water-based latexes of the present invention can be used in combination with polymer compositions which lack good shear and/or cohesiveness to provide adhesive compositions with improved shear and cohesiveness. Accordingly, the invention also relates to a method for improving the shear and/or cohesion of an adhesive composition comprising an effective amount of a water-based latex (a).

The adhesive compositions according to the invention are particularly suitable for use as pressure sensitive and laminating adhesives. Accordingly, in another embodiment, the invention relates to pressure sensitive adhesives and laminating adhesives comprising the adhesive compositions of the invention discussed above.

The invention also relates to improved methods employing laminating adhesives and pressure sensitive adhesives. In particular, the invention relates to an improved method for laminating a first substrate to a second substrate comprising applying an adhesive composition to a surface of the first substrate and pressing the surface of the first substrate against the second substrate. The improvement is that the adhesive composition comprises a mixture of (a) a water-based latex comprising dispersed waterborne amino-functional polymer particles having a Tg of greater than about 0° C., dispersed waterborne acetoacetoxy-functional polymer particles having a Tg of greater than about 0° C., and water and (b) a non-acetoacetoxy functional polymer having a Tg of about 20° C. or lower. Alternatively, the adhesive composition may be simultaneously applied to both substrates while the substrates are pressed together.

Further, in yet another embodiment, the invention relates to an improved method of making a substrate bearing a coating of a pressure sensitive adhesive on at least one surface thereof comprising applying an adhesive composition to a surface of a substrate, the improvement wherein the adhesive composition comprises a mixture of (a) a water-based latex comprising dispersed waterborne amino-functional polymer particles having a Tg of greater than about 0° C., dispersed waterborne acetoacetoxy-functional polymer particles having a Tg of greater than about 0° C., and water and (b) a non-acetoacetoxy functional polymer having a Tg of about 0° C. or lower.

DETAILED DESCRIPTION OF THE INVENTION

The present invention provides a water-based latex. In one embodiment, the latex affords a stable, emulsion containing a blend (or mixture) of dispersed, waterborne polymer particles which undergo crosslinking upon film formation. Latexes of the invention are stable when stored at temperatures at or moderately above room temperature. Yet, a film or coating formed from a latex of the invention may be cured at room temperature (ambient cure) or at elevated temperatures (thermal cure). A water-based latex comprises dispersed, waterborne amino-functional polymer particles; dispersed, waterborne acetoacetoxy-functional polymer particles, and water. In other words, a water-based latex of the invention is an aqueous dispersion containing separate waterborne amino-functional polymer particles and separate waterborne acetoacetoxy-functional polymer particles.

In the water-based latexes of the invention, the polymers generally exist as particles dispersed in water. The particles may be structured or unstructured. Structured particles include, but are not limited to, core/shell particles and gradient particles. The particle size of the polymers may range from about 25 to about 500 nm. Preferred particle sizes for small particles range from about 25 to about 100 nm, and more preferably from about 45 to about 80 nm. For large particles, preferred particles sizes range from about 110 to about 450 nm.

The polymer particles generally have a spherical shape. In a preferred embodiment, the generally spherical polymeric particle has a core portion and a shell portion. The core/shell polymer particles may also be prepared in a multilobe form, a peanut shell, an acorn form, or a raspberry form. It is further preferred in such particles that the core portion comprises about 20 to about 80 percent of the total weight of said particle and the shell portion comprises about 80 to about 20 percent of the total weight volume of the particle.

The Amino-functional Polymer

Polymers having amino (NH) groups available to react with the acetoacetoxy-functional polymer upon film formation may be used as an amino-functional polymer in a water-based latex of the invention. The amino groups may be primary or secondary amines. In general, the amino groups should be present at or near the surface of the polymer particle to react with the acetoacetoxy-functional polymer. The amino-functional polymer should contain a sufficient number of amino groups to permit efficient crosslinking with the acetoacetoxy-functional polymer. Exemplary amino-functional polymers include, but are not limited to, polymeric (polyamino)enamines and polymers prepared by reacting aziridines with carboxylic acid-containing latexes such as described in U.S. Pat. No. 3,261,796.

Polymeric (polyamino)enamines represent a particularly preferred group of amino-functional polymers for use in a water-based latex according to the invention. Reacting a surfactant-containing acetoacetoxy-functional polymer (SAAP) with ammonia, a primary or secondary amine yields a surfactant-containing enamine-functional polymer of the invention. A polymeric (polyamino)enamine (PPAE) results from the reaction of a SAAP with a poly(alkylenimine). Polymeric (polyamino)enamines represent a particularly preferred group of amino-functional polymers for use in a waterborne polymer composition according to the invention. These various polymers according to the invention, their preparation, and the related preferred embodiments are discussed below.

The SAAP may be prepared by free radical emulsion polymerization of a non-acid vinyl monomer having an acetoacetoxy functionality such as those of Formula (1) below with at least one non-self-polymerizing, surface-active vinyl monomer and other non-acid vinyl monomers. This affords water-based dispersion of surfactant-containing polymer particles with the polymer having pendant acetoacetoxy groups. As used here, a non-acid vinyl monomer is an ethylenically-unsaturated, non-carboxylic acid-containing monomer. A pendant acetoacetoxy group is not strictly limited to those at the termini of the polymer. Pendant acetoacetoxy groups also include groups attached to the polymer's backbone and available for further reaction.

The SAAP preferably contains about 1 to about 40 weight percent acetoacetoxy-functional monomers such as those of Formula (1) below, about 0.05 to about 20 weight percent of at least one non-self-polymerizing, surface-active vinyl monomer and about 60 to about 90 weight percent of other non-acid vinyl monomers. The weight percentage is based on the total amount of monomer. More preferably, the SAAP has about 10 to about 25 weight percent acetoacetoxy monomers; about 0.1 to about 10 weight percent, even more preferably about 0.5 to about 5 weight percent of at least one non-self-polymerizing, surface-active vinyl monomer; and about 75 to about 90 weight percent of other vinyl monomers.

The water-based emulsion polymerization to prepare the SAAP preferably occurs in the presence of a nonionic surfactant and an anionic surfactant. The nonionic surfactant may be present in amounts ranging from about 0.25 to about 5 phr, and the anionic surfactant in amounts ranging from about 0.1 to 1 phr. The unit "phr" defines the grams dry weight of the recited component, for example the surfactant, per 100 grams dry weight of the resin, where the "resin" includes all polymerization components excluding water. Aspects of this emulsion polymerization and preferred embodiments are discussed below.

Any non-acid vinyl monomer having acetoacetoxy-type functionality may be used to prepare an amino-functional polymer of the invention. Of such monomers, preferred monomers are those of Formula (1).

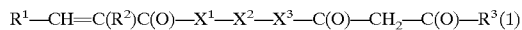

For an acetoacetoxy-type monomer of Formula (1), $R^1$ is a hydrogen or halogen. $R^2$ is a hydrogen, halogen, $C_1$–$C_6$ alkylthio group, or $C_1$–$C_6$ alkyl group. $R^3$ is a $C_1$–$C_6$ alkyl group. $X^1$ and $X^3$ are independently O, S, or a group of the formula

where R' is a $C_1$–$C_6$ alkyl group. $X^2$ is a $C_2$–$C_{12}$ alkylene group or $C_3$–$C_{12}$ cycloalkylene group. The alkyl and alkylene groups described here and throughout the specification may be straight or branched groups. Preferred monomers of Formula (1) are acetoacetoxyethyl methacrylate, acetoacetoxyethyl acrylate, acetoacetoxy(methyl)ethyl acrylate, acetoacetoxypropyl acrylate, allyl acetoacetate, acetoacetamidoethyl (meth)acrylate, and acetoacetoxybutyl acrylate. Acetoacetoxyethyl methacrylate (AAEM) represents a particularly preferred monomer of Formula (1).

Suitable non-acid vinyl monomers which may be used, for example, include, but are not limited to, methyl acrylate; methyl methacrylate; ethyl acrylate; ethyl methacrylate; butyl acrylate; butyl methacrylate; isobutyl acrylate; isobutyl methacrylate; ethylhexyl acrylate; 2-ethylhexyl methacrylate; octyl acrylate; octyl methacrylate; iso-octyl acrylate; iso-octyl methacrylate; trimethylolpropyl triacrylate; styrene; a-methyl styrene; glycidyl methacrylate; carbodiimide methacrylate; $C_1$–$C_{18}$ alkyl crotonates; di-n-butyl maleate; di-octylmaleate; allyl methacrylate; di-allyl maleate; di-allylmalonate; methoxybutenyl methacrylate; isobornyl methacrylate; hydroxybutenyl methacrylate; hydroxyethyl (meth)acrylate; hydroxypropyl (meth) acrylate; acrylonitrile, vinyl chloride; ethylene; vinyl ethylene carbonate; epoxy butene; 3,4-dihydroxybutene; hydroxyethyl (meth)acrylate; methacrylamide; acrylamide; butyl acrylamide; ethyl acrylamide; vinyl (meth)acrylate; isopropenyl (meth)acrylate; cycloaliphaticepoxy (meth) acrylates; and ethylformamide. Such monomers are described in "The Brandon Worldwide Monomer Reference Guide and Sourcebook," Second Edition, 1992, Brandon Associates, Merrimack, New Hampshire; and in "Polymers and Monomers," the 1996-1997 Catalog from Polyscience, Inc., Warrington, Pa.

To increase polymer stability, a small amount (about 0.4 phr) of sodium 2-acrylamido-2-methylpropane sulfonate, (AMPS) and other stabilizing monomers may be incorporated into the SAAP. Adding such stabilizing monomers to the polymer shell, for example, aids in preventing flocculation upon the addition of a polyalkylenimine to form a PPAE. High levels of such stabilizing monomers may create water membrane layers between polymer particles in the latex or disrupt film formation. AMPS is available from Lubrizol Corporation under the LUBRIZOL 2405 Trade name.

Vinyl esters of the general Formula (2) represent further examples of non-acid vinyl monomers:

In Formula (2), R is independently hydrogen or an alkyl group of up to 12 carbon atoms. Particular monomers of Formula (2) include $CH_2$=CH—O—C(O)—$CH_3$, $CH_2$=CH—O—C(O)—C($CH_3$)$_3$, $CH_2$=CH—O—C(O)—CH($C_2H_5$)($C_4H_9$), and $CH_2$=CH—O—C(O)—$CH_2CH_3$. Vinyl ester monomers also include vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

As a further preferred embodiment, the SAAP may also incorporate nitrogen-containing, non-acid vinyl monomers known to promote wet adhesion. Exemplary wet adhesion monomers include, for example, t-butylaminoethyl methacrylate; dimethylaminoethyl methacrylate; diethylaminoethyl methacrylate; N,N-dimethylaminopropyl methacrylamide; 2-t-butylaminoethyl methacrylate; N,N-dimethylaminoethyl acrylate; N-(2-methacrylamido-ethyl) ethylene urea; and N-(2-methacryloyloxy-ethyl)ethylene urea. N-(2-methacryloyloxyethyl)ethylene urea is available from RohmTech as 50% solution in water under the Rohamere 6852-O trade name and as a 25% solution in water under the Rohamere 6844 trade name. N-(2-methacrylamido-ethyl)ethylene urea is available from Rhone-Poulenc under the WAM trade name.

Small amounts of acid vinyl monomers may also be used to prepare an SAAP according to the invention. Such acid vinyl monomers include, for example, acrylic acid, methacrylic acid, itaconic acid, crotonic acid, and monovinyl adipate. Generally these monomers are used in small amounts. Preferably, the amount of acid vinyl monomers may range, for example, from 0 to 5 phr. Greater amounts may be used to achieve a desired effect, such as increased viscosity.

Preparation of the SAAP reacts non-acid vinyl monomers, such as described above, with at least one non-self-polymerizable, surface-active vinyl monomer (also known as a non-self-polymerizable ethylenically-unsaturated surfactant or a reactive surfactant). A non-self-polymerizable surfactant monomer, rather than polymerizing with itself to form a separate polymeric surfactant, is substantially (preferably completely) incorporated into the polymer of the invention. Thus, the surfactant becomes part of the polymer. Non-self-polymerizing surfactants possessing, for example, propenylphenyl or allyl groups are preferred. Examples include surface active monomers sold by PPG Industries, Inc., as MAZON® SAM 181, 183, 184, 211 surfactants which are anionic sulfates or sulfonates and MAZON® SAM 185–187 surfactants which are nonionic surfactants. Other non-self-polymerizing, surface-active vinyl monomers include the macro monomers sold by Daiichi Kogyo Seiyaku under the names NIOGEN RN, AQUARON or HITENOL surfactants. These include polyoxyethylene alkyl phenyl ether compounds of the general formulae (3), (4), and (5):

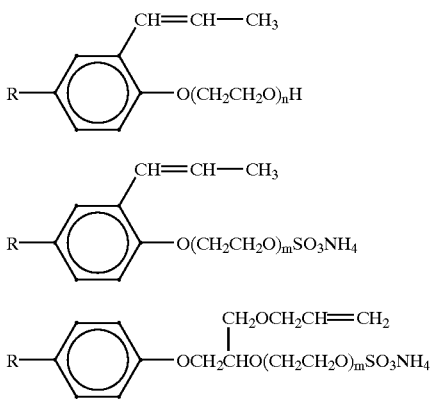

In Formulae (3), (4), and (5), R is nonyl or octyl and n and m are preferably integers of from 15 to 50 and 15 to 40, respectively. More preferably, n ranges from 20 to 40, and m from 15 to 25. HITENOL RN, HITENOL HS-20 and HITENOL A-10 products are particularly preferred non-self-polymerizing, surface-active monomers. Other such polymerizable surfactants include the sodium alkyl allyl sulfosuccinate sold by Henkel, under the trade name TREM LF-40 surfactant.

The SAAP (as well as other polymers useful in the invention) may be prepared using emulsion polymerization techniques known in the art. The polymer may, as is known in the art, be prepared using free radical emulsion polymerization techniques which yield structured or unstructured particles. As mentioned above, structured particles include, for example, core/shell particles, raspberry particles, and gradient particles. Chain transfer agents, initiators, reducing agents, buffers, and catalysts, known in the art of emulsion polymerization, may be used to prepare the polymers.

Exemplary chain transfer agents are butyl mercaptan, dodecyl mercaptan mercaptopropionic acid, 2-ethylhexyl 3-mercaptopropionate, n-butyl 3-mercaptopropionate, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate, and the reactive chain transfer agents taught in U.S. Pat. No. 5,247,040, incorporated herein by reference. In particular, 2-ethylhexyl 3-mercaptopropionate represents a preferred chain transfer agent.

Typical initiators include hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Polymerization catalysts are those compounds which increase the rate of polymerization and which, in combination with the above described reducing agents, may promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

As discussed above, the emulsion polymerization to prepare the SAAP preferably occurs in water and in the presence of a nonionic surfactant and/or an anionic surfactant. Suitable nonionic surfactants include surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, and triisopropyl phenol. Preferred nonionic surfactants are the TERGITOL 15-S-40 and TERGITOL NP-40 surfactants available from Union Carbide. TERGITOL 15-S-40 surfactant (CAS # 68131-40-8) is a reaction product of a mixture of 11–15 carbon, linear secondary alcohols and ethylene oxide. TERGITOL NP-40 surfactant is the reaction product of a nonylphenol and about 40 moles of ethylene oxide. Another preferred nonionic surfactant is SURFYNOL 485 surfactant available from Air Products.

Anionic surfactants which may be used in the invention include surfactants such as alkali metal or ammonium salts of alkyl, aryl or alkylaryl sulfonates, sulfates, phosphates, and the like. These anionic surfactants include, for example, sodium lauryl sulfate, sodium octylphenol glycolether sulfate, sodium dodecylbenzene sulfonate, sodium lauryl-diglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like. AEROSOL 18 surfactant, a 35% solution of N-octyldecyl sulfosuccinimate in water and AEROSOL OT-75 surfactant, a 75% solution of sodium dioctyl sulfosuccinate in water, from Cytech are preferred anionic surfactants.

Water-dispersible and water-soluble polymers may also be employed as surfactants/stabilizers in the water-based latexes of the invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; and alkali-soluble acrylic resins as described in U.S. Pat. No. 4,839,413, the disclosures of which are hereby incorporated by reference. Cellulosics and polyvinyl alcohols may also be used.

To form a PPAE, a SAAP is reacted with a poly (alkylenimine). In general, a poly(alkylenimine) contains primary, secondary, and tertiary amine groups. Primary and secondary amine groups of the poly(alkylenimine) react with the pendant acetoacetoxy groups on the SAAP to form enamine linkages yielding a polymeric (polyamino)enamine or PPAE.

A poly(alkylenimine) for use in the invention may have a weight average molecular weight of about 200 to about 750,000. The poly(alkylenimine) is preferably a poly (ethylenimine) (PEI) and more preferably PEI having a weight average molecular weight of about 800 to about 25,000. Such PEI compounds are commercially available from many sources and include POLYMIN poly (ethylenimine) and LUPASOL poly(ethylenimine) available from BASF Corporation. BASF polyethylenimine product literature reports the ratio of primary:secondary:tertiary amine groups to be about 1:2:1. A preferred PEI, LUPASOL G35 poly(ethylenimine), has a molecular weight of about 2,000 and a ratio of primary:secondary:tertiary amine groups of about 1.5:1.4:1.

The reaction to form the PPAE may be accomplished by adding, with stirring, the appropriate poly(alkylenimine) to an emulsion of the SAAP. Sufficient poly(alkylenimine) should be used to achieve a molar ratio of NH groups to acetoacetoxy groups of about 1 to about 8 and preferably a molar ratio from about 2 to about 5. The amount of poly (alkylenimine) added to the polymer having pendant acetoacetoxy groups may range from about 5 phr (grams dry weight poly(alkylenimine) to 100 grams dry weight resin) to about 30 phr and preferably from about 8 phr to about 25 phr. Water-based emulsions of the polymers may be combined over about 15–30 minutes at ambient temperature. When preparing the PPAE in a direct process, the reaction mixture containing the polymer having pendant acetoacetoxy groups may need to be cooled before adding the poly(alkylenimine).

The Acetoacetoxy-functional Polymer

Any vinyl polymer having pendant acetoacetoxy groups or their derivatives may be used as the acetoacetoxy-functional polymer in the water-based latex of the invention. Polymers having pendant acetoacetoxy groups have been described, for example, in U.S. Pat. No. 4,987,186; U.S. Pat. No. 4,908,403; European Patent Application No. 0 573 142 A1; European Patent Application No. 0 483 915 A1; and in Del Rector, et al., "Applications for the Acetoacetoxy Functionality in Thermoset Coatings", presented at the Water-Borne and Higher Solids Coatings Symposium, Feb. 3–5, 1988, New Orleans, La. These documents are incorporated herein by reference.

The polymers having pendant acetoacetoxy groups or derivatives of acetoacetoxy groups may be prepared using emulsion polymerization techniques known in the art, such as described above. Generally, the acetoacetoxy-functional polymer is prepared by emulsion polymerization of acetoacetoxy monomers such as Formula (1) above with other vinyl monomers. These polymers may contain both acid- and non-acid vinyl monomers. See U.S. Pat. No. 4,987,186; U.S. Pat. No. 4,908,403; European Patent Application No. 0 573 142 Al; European Patent Application No. 0 483 915 A1; and Del Rector, et al., supra. Preferred acetoacetoxy-functional monomers and non-acid vinyl monomers are the same as those discussed above in regards to the SAAP. The acetoacetoxy-functional polymer need not incorporate a surface-active vinyl monomer, but in a preferred embodiment may be the SAAP used to prepare the PPAE. More preferably, the emulsion polymerization used to prepare the acetoacetoxy-functional polymer is carried out in the presence of a nonionic surfactant and an anionic surfactant as described above for the SAAP.

The acetoacetoxy-functional polymer should contain sufficient acetoacetoxy-functionality to allow it to react and cross-link with the amino-functional polymer, preferably the PPAE, upon film formation. The acetoacetoxy-functional polymer may, for example, generally contain from about 1 weight percent to about 40 weight percent of acetoacetoxy-functional monomers and about 60 to about 99 weight percent of other vinyl monomers. The amount of acetoacetoxy-functional monomers may vary outside this range depending on the properties needed for a particular application. Conventional coatings usually contain between 2 to 25 weight percent acetoacetoxy-functional monomers, which is a preferred range for an acetoacetoxy-functional polymer used in the present invention. The acetoacetoxy-functional polymer may be a high or low molecular weight polymer with an average molecular weight ranging, for example, from about 1000 to over 1 million. Lower molecular weight polymers should contain more acetoacetoxy-functional monomers to assure sufficient crosslinking with the amino-functional polymer upon film formation and cure.

The acetoacetoxy functionality in the acetoacetoxy-functional polymer may be present as free acetoacetoxy groups or as derivatives of those groups such as, for example, an enamine group or acetoacetamide group. The acetoacetoxy-functional polymer may contain both free acetoacetoxy groups and acetoacetoxy derivatives. When the acetoacetoxy-functional polymer contains acetoacetoxy derivatives, the polymer should be capable of crosslinking with the amino-functional polymer upon film formation. This crosslinking may occur through acetoacetoxy groups or the derivative groups.

Enamine-functional polymers represent a preferred derivative of polymers having pendant acetoacetoxy groups. Enamine-functional polymers may be used as the acetoacetoxy-functional polymer in the water-based latex of the invention. In water-based latexes, the enamine functionality serves to stabilize the acetoacetoxy- groups and protect them from hydrolysis. Enamine-functional polymers have been described in Moszner et al., Polymer Bulletin 32, 419–426 (1994); European Patent Application No. 0 492 847 A2; U.S. Pat. No. 5,296,530; and U.S. Pat. No. 5,484, 849. These documents are incorporated herein by reference in their entireties.

Enamine-functional polymers may be prepared by reacting a polymer having acetoacetoxy groups with ammonia or a primary or secondary amine. This preparation of enamine-functional vinyl polymers having pendant enamine groups is described in U.S. Pat. No. 5,484,849. Typically, the reaction stoichiometry uses at least one molar equivalent of amino (NH) groups to acetoacetoxy groups. Though the reaction is rapid, an equilibrium exists between the enamine product and the acetoacetoxy/NH reactants. The rate of enamine formation increases with temperature. Due to the equilibrium, however, an enamine-functional polymer may have both enamine and acetoacetoxy groups.

Enamine-functional polymers or copolymers may also be prepared by polymerization of enamine-functional monomers. This method of preparation is described Moszner et al., Polymer Bulletin 32, 419–426 (1994).

Enamine-functional polymers also having allyl functionalities are described in U.S. Pat. No. 5,539,073 which is incorporated herein by reference. During emulsion polymerization, allyl functionality may be incorporated into the particles using, for example, allyl methacrylate and acetoacetoxy and/or enamine functionality may be incorporated using, for example, acetoacetoxy methacrylate. Waterborne allyl-functional polymer particles form coatings which cure slowly at room temperature. Coatings formed from a blend of acetoacetoxy-functional particles, such as enamine-functional polymers, with amino-functional polymer particles, according to the invention, cure rapidly to form crosslinks. However, unwanted side reactions may produce coatings which are yellowed. Waterborne polymer particles having allyl functionality and acetoacetoxy and/or enamine functionality produce coatings which have little or no yellowing than coatings of comparable crosslinked density produced from enamine-based particles alone. According to the invention, waterborne polymer particles which contain allyl and enamine and/or acetoacetoxy functionality can be blended with waterborne amino-functional polymer particles to produce coatings which cure faster than coatings prepared from allyl-based waterborne particles. In addition, this combination of crosslinking chemistry provides coatings with less yellowing than cured coatings prepared from a blend of enamine-based and/or acetoacetoxy-functional polymer particles and amino-functional polymer particles.

Water-based Latexes of the Invention

In a water-based latex of the invention, the amino-functional polymer particles, (preferably PPAE particles)

may be present from about 5 to about 50 weight percent based on dry resin and more preferably from about 10 to about 25 weight percent. The acetoacetoxy-functional polymer may be present from about 50 to about 95 weight percent based on dry resin. The acetoacetoxy-functional polymer is, more preferably, present from about 75 to about 90 weight percent based on dry resin.

The examples below illustrate the preparation of a water-based latex according to the invention. In general, the latex of the invention may be prepared by mixing aqueous latexes of the amino-functional polymer particles and of the acetoacetoxy-functional polymer particles. Accordingly, a water-based latex of the invention may be a "one pack" pre-mixed latex or a "two pack" for mixing prior to use. Due to the advantageous stability of a water-based latex of the invention containing the amino-functional polymer particles and of the acetoacetoxy-functional polymer particles, "one pack" latexes are preferred. The surfactants discussed above are preferably components of those latexes, providing stability prior to and after mixing. A latex of the invention may also contain other additives known in latex compositions and may use other emulsion polymerization or blending methodology such as disclosed in U.S. Pat. No. 5,371,148, incorporated here by reference.

A preferred embodiment of the invention relates to a latex containing dispersed, waterborne amino-functional polymer particles, (preferably PPAE particles); dispersed, waterborne acetoacetoxy-functional polymer particles; and a buffer, particularly an ammonium-based buffer. The pH of a water-based latex of the invention may be adjusted and/or buffered using, for example, sodium bicarbonate, ammonium bicarbonate, ammonium dihydrogenphosphate, an ammonium salt of a poly(meth)acrylate, or a mixture of such buffers. The buffering compound, such as ammonium bicarbonate, may be added to an aqueous dispersion of either amino-functional polymer particles or acetoacetoxy-functional polymer particles prior to mixing or to the final latex. Preferably the buffer is added to the final blended latex.

When an ammonium buffer is used, an equilibrium exits between the ammonium ion and amine groups on the amino-functional polymer particles. This equilibrium provides free ammonia to the latex which may react with the acetoacetoxy groups on the acetoacetoxy-functional polymer to form enamine groups. Not only does this provide stability to the acetoacetoxy-functional polymer, but it also may lower and buffer the pH of the overall latex. Latexes having pH values in the range of about 7.0 to 9.2, preferably about 8.4 to 9.2, may be achieved using ammonium buffers. Moreover, the buffered latexes of the invention possess increased stability (shelf life) at elevated temperatures and for long periods of time.

The water-based latexes of the invention will vary in properties, depending on the end-use application. In general, the amino-functional polymer and the acetoacetoxy-functional polymer of the water-based latex may have a glass transition temperature (Tg) of −50 to +100° C., more preferably, −35 to about +50° C. Illustratively, when used as part of an adhesive composition, the amino-functional polymer and the acetoacetoxy-functional polymer of the water-based latex have glass transition temperatures of greater than about 0° C., preferably 0 to about 100° C., more preferably 0 to about 50° C. Also, when used as part of an adhesive composition, the dispersed waterborne amino-functional polymer particles of the water-based latex may have a weight average molecular weight of from about 5,000 to about 500,000, more preferably from about 10,000 to about 300,000; and the dispersed waterborne acetoacetoxy-functional polymer particles of the water-based latex, from about 5,000 to about 900,000, more preferably from about 10,000 to about 300,000.

The water-based latexes are useful in a variety of coating compositions including adhesive compositions. Accordingly, the invention also relates to an adhesive composition comprising a mixture of (a) a water-based latex comprising dispersed waterborne amino-functional polymer particles having a Tg of greater than about 0° C., dispersed waterborne acetoacetoxy-functional polymer particles having a Tg of greater than about 0° C., and water and (b) a non-acetoacetoxy functional polymer having a Tg of about 20° C. or lower. In a preferred embodiment, the amino-functional polymer in the water-based latex (a) is a polymeric (polyamino) enamine comprising the reaction product of a surfactant-stabilized acetoacetoxy-functional polymer and a poly(alkylenimine). Indeed, it has been discovered that the water-based latexes of the invention, as described above, can be used in combination with polymer combinations which lack good shear and/or cohesiveness to provide adhesive compositions with improved shear and cohesiveness. Accordingly, the non-acetoacetoxy functional polymer (b) of the adhesive compositions of the present invention is not particularly limited, so long as it does not react with the poly(alkylenimine) of water-based latex (a) and is stable at the pH of formulation, which, as discussed above, can vary. Examples of suitable non-acetoacetoxy functional polymers include, but are not limited to, water dispersible polymers such as water dispersible polymers such as polyesteramides, alkyds, polyurethanes, polyamides, acrylics, vinyl polymers, polymers having pendant allyl groups such as described in U.S. Pat. No. 5,539,073, styrene-butadiene polymers, and vinylacetate-ethylene copolymers or mixtures thereof. Acrylic and vinyl acrylic polymers are the preferred non-acetoacetoxy polymers for use in the present invention. Suitable acrylic and vinyl acrylic polymers include, but are not limited to polymers prepared from the following monomers: methyl acrylate; methyl methacrylate; ethyl acrylate; ethyl methacrylate; butyl acrylate; butyl methacrylate; isobutyl acrylate; isobutyl methacrylate; ethylhexyl acrylate; ethylhexyl methacrylate; octyl acrylate; octyl methacrylate; glycidyl methacrylate; carbodiimide methacrylate; allyl methacrylate; methoxybutenyl methacrylate; isobornyl methacrylate; hydroxybutenyl methacrylate; hydroxyethyl (meth)acrylate; hydroxypropyl (meth)acrylate; methacrylamide; acrylamide; butyl acrylamide; ethyl acrylamide; vinyl (meth)acrylate; isopropenyl (meth)acrylate; and cycloaliphatic epoxy (meth)acrylates.

Generally, the non-acetoacetoxy functional polymer may be present from about 5 to about 65 weight percent based on dry resin and more preferably from about 25 to about 55 weight percent.

The glass transition temperature (Tg) of the non-acetoacetoxy functional polymer is not particularly limited and varies depending upon the properties required of the resulting adhesive. Typically, the Tg of the non-acetoacetoxy functional polymer is about 20° C. or less. For example, for pressure sensitive adhesive applications, the Tg of the non-acetoacetoxy functional polymer may be about 0° C. or less, preferably less than about −20° C. For laminating adhesive compositions, a preferred Tg of the non-acetoacetoxy functional polymer is from about −20° C. to about 20° C.

The ratio of the amount of the water-based latex (a), which comprises dispersed waterborne amino-functional polymer particles, dispersed waterborne acetoacetoxy-functional polymer particles, and water, to the non-acetoacetoxy functional polymer (b), used in the adhesive compositions of the invention varies depending upon the desired adhesive properties. Generally, this ratio varies from about 1:10 to 4:1. For example, for applications such as pressure sensitive adhesives, the adhesive may comprise between about 2% to about 50% of the water-based latex (a) based on the combined weight of the water-based latex (a) and the non-acetoacetoxy functional polymer (b). Preferably, the water-based latex is present at about 2% to about 35%, and more preferably, between about 2% and about 25%. For laminating adhesives, the adhesive may comprise between about 2% to about 50% of the water-based latex (a) based on the combined weight of the water-based latex (a) and the non-acetoacetoxy functional polymer (b). Preferably, the water-based latex is present at about 2% to about 35%, and more preferably, between about 2% and about 30%. However, these percentages are merely illustrative and can be affected by dilution of the compositions, for example, with water. Further, the above-mentioned ratios may vary according to the adhesive properties desired.

As mentioned above, adhesive compositions comprising a water-based latex of the present invention and a non-acetoacetoxy functional polymer are particularly suitable for use as pressure sensitive adhesives and as laminating adhesives. A discussion of pressure sensitive adhesives and their applications may be found in U.S. Pat. No. 5,362,816, the disclosure of which is herein incorporated by reference in its entirety. A discussion of lamination adhesives and their applications may be found, for example, in U.S. Pat. Nos. 5,891,950 and 5,821,294, the disclosures of which are herein incorporated by reference in their entireties.

Pressure-sensitive adhesives (PSAs) are used in the manufacture of a variety of articles such as adhesive tapes and other materials which are intended to be easily attachable to another substrate by the application of pressure alone. Many adhesives preferably have a balance of one or more properties such as tackiness at the temperature of use, adhesion (peel resistance), cohesion (shear resistance), elongation, elasticity, color clarity and color stability, and resistance to sunlight and other ultraviolet and degrading radiation sources.

The suitability of pressure-sensitive adhesive compositions is also influenced to a large extent by the ease of manufacture of both the adhesive and of articles containing the adhesive and by environmental and personnel safety hazards. For instance, PSAs are typically applied to a backing as hot melts, polymer solutions or as dispersions of a polymer in an aqueous medium. Such solutions and dispersions must possess properties which facilitate their use in the manufacture of PSA-containing articles. Thus, the melt, solution or dispersion, as well as the polymer per se, must adequately wet the backing to assure adequate adhesive distribution, coverage and bonding to the backing.

Various formulating agents may be added to the pressure sensitive adhesive compositions of the present invention to the extent that such additives are compatible with the adhesive compositions. Suitable additives are taught, for example, by U.S. Pat. Nos. 5,122,567, 5,362,816, and 5,821,294, the disclosures of which are herein incorporated by reference. Such additives include, but are not limited to, protective colloids, tackifiers, fillers and/or extenders such as dispersible clays, colorants such as pigments and dyes, solvents, thickeners, plasticizers, coalescing agents, preservative agents such as biocides, fungicides, and mildewcides, buffers, agents to adjust pH, surfactants, and catalysts.

The pressure sensitive adhesive compositions according to the invention can be used to make a substrate bearing a coating of a pressure sensitive adhesive. The method comprises applying an adhesive composition to a surface of a substrate, wherein the adhesive composition comprises a mixture of (a) a water-based latex comprising dispersed waterborne amino-functional polymer particles having a Tg of greater than about 0° C., dispersed waterborne acetoacetoxy-functional polymer particles having a Tg of greater than about 0° C., and water and (b) a non-acetoacetoxy functional polymer. In a preferred method, the amino-functional polymer of water-based latex (a) is a polymeric (polyamino) enamine comprising the reaction product of a surfactant-stabilized acetoacetoxy-functional polymer and a poly(alkylenimine), The pressure-sensitive adhesives of the present invention can be applied to any backing which it is desired to adhere to another surface or article. Illustrative backings include flexible and rigid (solid), natural and synthetic materials such as plastics, elastomers, solid metals and foils, ceramics (tiles, glass, and the like), wood, papers and cardboard, leather materials, etc. of essentially any form including films, solid articles, woven and non-woven textile materials, and the like. Illustrative uses of such articles include wall coverings (paper, fabric, films, and the like), upholstery items, construction roofing and siding materials, tapes of all varieties (including those having backings comprised of woven or non-woven fabrics, paper, polymeric films, metal foils, foams, etc., including double-faced tapes and so-called transfer tapes), packaging, floor and wall tile, other floor and wall coverings, and paneling, and the like.

Suitable backing and substrate materials can be of essentially any chemical composition and include, for example, metals, ceramics (including glass), and natural and synthetic polar and non-polar materials such as polyolefins, e.g., homopolymers and interpolymers of substituted and non-substituted olefinically unsaturated hydrocarbons including ethylene, propylene, styrene, butadiene, dicyclopentadiene, etc., and materials which typically contain polar functional groups such as hydroxy, etheral, carbonyl, carboxylic acid (including carboxylic acid salts), carboxylic acid esters (including thio esters), amides, amines, and the like. Essentially all natural materials include one or more polar functional groups. Illustrative are virgin and reclaimed cellulosic fibers such as cotton, paper, wood, coconut fiber, jute, hemp, and the like, and proteinaceous materials such as leather, wool, and other animal fur. Illustrative synthetic materials containing polar functional groups are polyesters, polyamides, carboxylated styrene-butadiene polymers, etc., such as Nylon-6, Nylon-66, Nylon-610, "Dacron", "Fortrel", "Kodel", "Acrilan", "Orlon", "Creslan", "Verel" and "Dynel". Illustrative of other useful materials which are also polar are synthetic carbon, silicon, and magnesium silicate (e.g., asbestos). Preferred substrates or backings for the adhesive composition of the present invention are polypropylene, polyethylene, polyethylene terephthalate, and polyvinyl chloride.

The adhesive compositions of the present invention may be applied to the backing by any one of a variety of conventional coating techniques such as roll coating, spray coating, and curtain coating. They also may be applied to the backing without modification by extrusion coating, coextrusion, and hot melt coating by employing suitable conventional coating devices known for such coating methods. While primers may be employed to pretreat the backing, they are unnecessary in many applications. Dry coating weight (the weight of dry adhesive applied per unit surface area) can vary substantially depending upon the porosity and irregularity of the backing and of the substrate surface to which the backing is to be adhered, and other factors. For instance, higher polymer loadings are preferred for adhering porous, irregular ceramic tiles to porous surfaces, while lower adhesive loadings are usually required to manufacture tapes, films, and other articles from relatively non-porous, smooth-surfaced materials such as synthetic polymer films and sheets. When the adhesive is applied to non-porous polymeric or metallic substrates intended for adhesion to non-porous polymeric or metallic surfaces, adhesive loadings of about 5 to about 50 pounds of dry adhesive per 3,000 square feet of treated surface are generally adequate. Adequate adhesion in tapes manufactured from continuous sheet polymeric substrates can usually be achieved with dry coating adhesive weights of about 10 to about 20 pounds per 3,000 square feet of treated surface, while coating weights of 20 to about 40 pounds per 3,000 square feet are usually employed for paper-backed tapes such as masking tapes.

As mentioned above, the adhesive compositions of the present invention are also suitable for use as laminating adhesives. Adhesive lamination is often used in association with flexible packaging material, but is not limited thereto. All of the materials listed above as substrates or backings for the pressure sensitive adhesives may be laminated utilizing the adhesive compositions of the present invention. Preferred substrates or backings are polypropylene, polyethylene, polyethylene terephthalate, and polyvinyl chloride.

In an embodiment of the invention, a first substrate may be laminated to a second substrate with an adhesive composition of the present invention by applying an adhesive composition to a surface of the first substrate and/or the second substrate and pressing the first and second substrates together. The inventive adhesive composition utilized in the laminating process comprises a mixture of (a) a water-based latex comprising dispersed waterborne amino-functional polymer particles having a Tg of greater than about 0° C., dispersed waterborne acetoacetoxy-functional polymer particles having a Tg of greater than about 0° C., and water and (b) a non-acetoacetoxy functional polymer having a Tg of about 20° C. or lower. In a preferred method, the amino-functional polymer of water-based latex (a) is a polymeric (polyamino) enamine comprising the reaction product of a surfactant-stabilized acetoacetoxy-functional polymer and a poly(alkylenimine).

Alternatively, the adhesive composition may be simultaneously applied to both substrates while the substrates are pressed together. For example, the first and second substrates may be pressed together by passing the substrates through a two roll nip. The inventive adhesive composition may be injected through an opening of the nip and towards the first and/or second substrate. Illustratively, the substrates may be laminated using an "in-line" process, which is generally described, for example, in U.S. Pat. No. 5,891, 950, the disclosure of which is herein incorporated by reference in its entirety.

Any of the water-based latexes described above for the present invention may be combined with the non-acetoacetoxy-functional polymers described above for use as laminating adhesives (as well as for use as pressure-sensitive adhesives). Further, any of the formulating agents described above for the pressure sensitive adhesive compositions may be utilized as part of the inventive laminating adhesive compositions.

Used in combination with certain other water-dispersible polymers, the water-based latexes of the invention bring a unique advantage to the final composition, in addition to their crosslinking ability, adhesion properties, and resistance properties. The PPAE, when present as a preferred amino-functional polymer, has the ability to scavenge residual $\alpha,\beta$-unsaturated, carbonyl- or electron withdrawing group-containing monomer remaining in the polymer latex. In other words, the PPAE scavenges, through a Michael-addition reaction, residual monomers such as $\alpha,\beta$-unsaturated acids, $\alpha,\beta$-unsaturated esters, $\alpha,\beta$-unsaturated amides, and $\alpha,\beta$-unsaturated nitrites. Removing these monomers can, not only eliminate the odors associated with them, but also improve health and safety when using the composition.

The following examples are intended to illustrate, not limit, the invention. The examples of various coating compositions of the invention use the following materials not described above:

LUPASOL G35 poly(ethylenimine), MW 2000, sold by BASF as a 50% solution in water.

PROXEL GXL preservative, sold by Zeneca.

DREWPLUS L-493 defoamer, sold by Drew Chemical.

TEXANOL coalescing solvent, sold by Eastman Chemical Company.

EASTMAN DM coalescing solvent, sold by Eastman Chemical Company.

The following methods were used to evaluate the coatings and films prepared according to the invention.

Latex Gel Fraction/Swell Ratio:

Latex gel fraction (LGF) is obtained by determining the insoluble weight fraction of polymer in a latex sample. Latex swell ratio (LSR) is obtained by determining the ratio of the insoluble polymer weight fraction swollen in the selected solvent (by weight) to dry weight of the insoluble weight fraction in a latex sample. Average values are determined from triplicate or quadruplicate measurements with acetone as the solvent.

The procedure used is as follows. For each sample determination, a centrifuge tube is baked in a vacuum oven at 120° C. for 90 minutes, cooled in a desiccator of $P_2O_5$ and weighed (W1). Enough latex is added to the conditioned tube to make approximately a 1% solution when solvent is added and the latex weight is recorded (W2). Solvent is added to the tube until the tube is approximately three fourths full and the solution is allowed to sit overnight. The next day, the sample is centrifuged at 75,530 rpm for 30 minutes. The clear liquid portion in the tube is removed. The remaining polymer gel is washed with additional solvent. The centrifuge and washing step is repeated twice more. Finally, the clear liquid portion is removed and the tube containing the wet gel is weighed (W3). The tube containing the wet gel is baked overnight in a forced air oven at 80° C. and then baked in a vacuum oven at 120° C. for 3 hours and cooled in a desiccator over $P_2O_5$. The tube plus dry solids is weighed and the vacuum portion of the baking procedure is repeated until reproducible weights are obtained (W4). Calculations were made according to the following equations:

$LGF=(W4-W1)/(W2*TS)$ $LSR=(W3-W1)/(W4-W1)$ where TS=total weight fraction solids of the latex.

Glass Transition

Onset and midpoint temperatures were determined on film samples using a differential scanning calorimeter (DSC) in a nitrogen atmosphere at a heating rate of 20° C./min. values quoted are from the reheat curve. The glass transition temperatures were measured using a "second cycle" test as is known to those skilled in the art. In the second cycle method, the glass transition temperature is measured a first time according to standard methods. The sample is cooled back to the starting point, and the glass transition temperature is then determined a second time. This second measurement is often referred to as a "second cycle glass transition temperature."

EXAMPLE 1

Preparation of Large Core/Shell Enamine-Containing Waterborne Polymer Latex

To a 3000 mL resin kettle equipped with a condenser, nitrogen purge, and subsurface feed tube were added 640 g of water, 4.05 g of TREM LF-40, 1.93 g of TERGITOL NP-40(70%), 7.3 g of sodium carbonate, 44.24 g of methyl methacrylate, 8.26 g of styrene, 57.09 g of 2-ethylhexyl acrylate, and 0.252 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 271.78 g of methyl methacrylate, 50.72 g of styrene, 350.63 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.466 g/min. After the first emulsion feed was completed, a second emulsion feed composed of 171 g of water, 12.79 g of AEROSOL 18, 5.09 g of TERGITOL NP-40 (70%), 180.88 g of styrene, 90.0 g of 2-ethylhexyl acrylate, 143.92 g of acetoacetoxyethyl methacrylate, and 1.68 g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The emulsion was cooled, and 45 g of ammonium hydroxide (28%) were pumped in over 15 minutes. The latex was then filtered through 100 mesh wire screen. Solids level, 46.0; pH, 8.4; amount of dried material (100 mesh screen), 11.6 g; particle size (Dw), 236 nm, ZETA potential, −47.1 mv, latex gel fraction/swell ratio 42/9.6. Infrared analysis of clear films cast over ZnSe showed an absorption at 1565 cm$^{-1}$ which represents an enamine moiety.

EXAMPLE 2

Preparation of Large Core/Shell PEI-Containing Waterborne Polymer Latex (Mole ratio of N—H group to acetoacetoxy group was 4.27.)

The procedure for the preparation of this latex was similar to the latex preparation described in Example 1 except that 247.35 g of poly(ethylenimine) (50% in water) was added in place of the ammonium hydroxide solution. Mole ratio of N—H group to acetoacetoxy group was 4.27. The latex was then filtered through 100 mesh wire screen. Solids level, 46.8; pH, 10; amount of dried material (100 mesh screen), 3.28 g; particle size (Dw), 225 nm, ZETA potential, −23.7 mv (pH=11.7), latex gel fraction/swell ratio 75/6.1. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine). After reacting the poly (ethylenimine) with the pendant acetoacetoxy group, the latex was centrifuged and the water phase analyzed. Elemental analysis of the water phase showed at most 2% of the poly(ethylenimine) remained in the water phase.

EXAMPLE 3

Preparation of Large Core/Shell PEI-Containing Waterborne Polymer Latex (Mole ratio of N—H group to acetoacetoxy group was 5.47.)

The procedure for the preparation of this latex was similar to the latex preparation described in Example 1 except that 316.86 g of poly(ethylenimine) (50% in water) was added in place of the ammonium hydroxide solution. Mole ratio of N—H group to acetoacetoxy group was 5.47. The latex was then filtered through 100 mesh wire screen. Solids level, 46.5; pH, 10; amount of dried material (100 mesh screen), 4.11 g; particle size (Dw), 225 nm, latex gel fraction/swell ratio 76/5.7. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine). After reacting the poly(ethylenimine) with the pendant acetoacetoxy group, the latex was centrifuged and the water phase analyzed. Elemental analysis of the water phase showed at most 2% of the poly(ethylenimine) remained in the water phase.

EXAMPLE 4

Preparation of Small Core/Shell Enamine-Containing Waterborne Polymer Latex

To a 3000 mL resin kettle equipped with a condenser, nitrogen purge, and subsurface feed tube were added 1100 g of water, 49.0 g of HITENOL HS-20, 8.05 g of TERGITOL NP-40(70%), 7.3 g of sodium carbonate, 44.24 g of methyl methacrylate, 8.26 g of styrene, 57.09 g of 2-ethylhexyl acrylate, and 0.252 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 273.5 g of water, 19.65 g of AEROSOL 18, 20.19 g of TERGITOL NP-40 (70%), 271.78 g of methyl methacrylate, 50.72 g of styrene, 350.63 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.466 g/min. After the first emulsion feed was completed, a second emulsion feed composed of 147 g of water, 12.15 g of AEROSOL 18, 12.5 g of TERGITOL NP-40 (70%), 180.88 g of styrene, 90.0 g of 2-ethylhexyl acrylate, 143.92 g of acetoacetoxyethyl methacrylate, and 1.68 g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The emulsion was cooled, and 45 g of ammonium hydroxide (28%) were pumped in over 15 minutes. The latex was then filtered through 100 mesh wire screen. Solids level, 41.0; amount of dried material (100 mesh screen), 4.8 g; particle size (Dw), 65 nm, latex gel fraction/swell ratio 57/11.6. Infrared analysis of clear films cast over ZnSe showed an absorption at 1565 cm$^{-1}$ which represents an enamine moiety.

EXAMPLE 5

Preparation of Small Core/Shell PEI-Containing Waterborne Polymer Latex (Mole ratio of N—H group to acetoacetoxy group was 4.27.)

The procedure for the preparation of this latex was similar to the latex preparation described in Example 1 except that 247.35 g of poly(ethylenimine) (50% in water) was added in place of the ammonium hydroxide solution. Mole ratio of N—H group to acetoacetoxy group was 4.27. The latex was then filtered through 100 mesh wire screen. Solids level, 41.6; pH, 10; amount of dried material (100 mesh screen), 3.03 g; particle size (Dw), 58 nm, latex gel fraction/swell ratio 62/5.6. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine). After reacting the poly(ethylenimine) with the pendant acetoacetoxy group, the latex was centrifuged and the water phase analyzed. Elemental analysis of the water phase showed at most 2% of the poly(ethylenimine) remained in the water phase.

EXAMPLE 6

Preparation of Small Core/Shell PEI-Containing Waterborne Polymer Latex (Mole ratio of N—H group to acetoacetoxy group was 5.43.)

The procedure for the preparation of this latex was similar to the latex preparation described in Example 1 except that 314.45 g of poly(ethylenimine) (50% in water) was added in place of the ammonium hydroxide solution. Mole ratio of N—H group to acetoacetoxy group was 4.27. The latex was then filtered through 100 mesh wire screen. Solids level, 41.6; pH, 10; amount of dried material (100 mesh screen), 3.03 g; particle size (Dw), 70 nm, latex gel fraction/swell ratio 61/6.5. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine). After reacting the poly(ethylenimine) with the pendant acetoacetoxy group, the latex was centrifuged and the water phase analyzed. Elemental analysis of the water phase showed at most 2% of the poly(ethylenimine) remained in the water phase.

EXAMPLE 7

Preparation of Large Core/Shell PEI-Containing Waterborne Polymer Latex (Mole ratio of N—H group to acetoacetoxy group was 2.12.)

To a 3000 mL resin kettle equipped with a condenser, nitrogen purge, and subsurface feed tube were added 640 g of water, 4.05 g of TREM LF-40, 1.93 g of TERGITOL NP-40(70%), 7.3 g of sodium carbonate, 55.23 g of methyl methacrylate, 4.03 g of styrene, 47.40 g of 2-ethylhexyl acrylate, 20.15 g of acetoacetoxyethyl methacrylate, and 0.336 g of trimethylolpropane triacrylate. A nitrogen purge was begun, then the contents of the reactor brought up to 80° C. at 400 rpm. After reaching 80° C., an initiator charge composed of 7.70 g of sodium persulfate dissolved in 43.6 g of water was added to the reactor. An emulsion feed composed of 355 g of water, 11.7 g of TREM LF-40, 10.21 g of TERGITOL NP-40 (70%), 271.78 g of methyl methacrylate, 50.72 g of styrene, 350.63 g of 2-ethylhexyl acrylate, and 1.55 g of trimethylolpropane triacrylate was begun at 8.38 g/min. Five minutes after the first emulsion feed was begun, an initiator solution composed of 4.36 g of sodium persulfate dissolved in 112 g of water was fed at 0.5.36 g/min. After the first emulsion feed was completed, a second emulsion feed composed of 171 g of water, 12.79 g of AEROSOL 18, 5.09 g of TERGITOL NP-40 (70%), 211.03 g of styrene, 80.0 g of 2-ethylhexyl acrylate, 123.77 g of acetoacetoxyethyl methacrylate, and 1.68 g of the sodium 2-acrylamido-2-methylpropanesulfonate (50% in water) was fed at 8.38 g/min. Five minutes after the last feed, an initiator solution of 1.34 g of t-butyl hydroperoxide, and 1.34 g of sodium formaldehyde sulfoxylate dissolved in 40.2 g of water was charged and heating continued for 30 minutes. The emulsion was cooled, and filtered through 100 mesh wire screen. Solids level, 46.64; pH, 8.2; amount of dried material (100 mesh screen), 24.65 g; Particle Size, (Electron Microscopy), 450 nm. To 2500 g of this latex were added over 15 minutes 115 g of poly(ethylenimine) (50%). Solids, 46.6%; pH, 10.4; Particle Size (Electron Microscopy), 450 nm. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine).

EXAMPLE 8

Preparation of Small Unstructured Enamine-Containing Waterborne Polymer Latex To a 1000 mL resin kettle equipped with a condenser, nitrogen purge, and subsurface feed tube were added 290 g of water, 15.52 g of HITENOL HS-20, 2.55 g of TERGITOL NP-40 (70%), 3.5 g of sodium carbonate, 8.10 g of methyl methacrylate, 5.38 g of 2-ethylhexyl acrylate, and 4.43 g of acetoacetoxyethyl methacrylate. A nitrogen purge was begun, then the contents of the reactor brought up to 80° C. at 400 rpm. After reaching 80° C., an initiator charge composed of 2.30 g of sodium persulfate dissolved in 13.0 g of water was added to the reactor. An emulsion feed composed of 120 g of water, 6.55 g of AEROSOL 18, 10.22 g of TERGITOL NP-40 (70%), 153.66 g of methyl methacrylate, 102.03 g of 2-ethylhexyl acrylate, and 84.21 g of acetoacetoxyethyl methacrylate was begun at 8.38 g/min. Five minutes after the first emulsion feed was begun, an initiator solution composed of 1.3 g of sodium persulfate dissolved in 33.5 g of water was fed at 0.536 g/min. Five minutes after the monomer feed, an initiator solution of 0.40 g of t-butyl hydroperoxide, and 0.40 g of sodium formaldehyde sulfoxylate dissolved in 12 g of water was charged and heating continued for 30 minutes. The emulsion was cooled, and 27.7 g of ammonium hydroxide (28%) were pumped in over 15 minutes. The latex was then filtered through 100 mesh wire screen. Solids level, 43.3; amount of dried material (100 mesh screen), 0.12 g; particle size (Dn), 50 nm. Infrared analysis of clear films cast over ZnSe showed an absorption at 1568 cm$^{-1}$ which represents an enamine moiety.

EXAMPLE 9

Preparation of Small Unstructured PEI-Containing Waterborne Polymer Latex (Mole ratio of NH group to acetoacetoxy group was 4.0)

To a 1000 mL resin kettle equipped with a condenser, nitrogen purge, and subsurface feed tube were added 232 g of water, 12.42 g of HITENOL HS-20, 2.02 g of TERGITOL NP-40(70%), 2.8 g of sodium carbonate, 4.15 g of methyl methacrylate, 5.38 g of 2-ethylhexyl acrylate, and 4.33 g of acetoacetoxyethyl methacrylate. A nitrogen purge was begun, then the contents of the reactor brought up to 80° C. at 400 rpm. After reaching 80° C., an initiator charge composed of 1.84 g of sodium persulfate dissolved in 10.4 g of water was added to the reactor. An emulsion feed composed of 96 g of water, 5.24 g of AEROSOL 18, 8.18 g of TERGITOL NP-40 (70%), 78.90 g of methyl methacrylate, 110.82 g of 2-ethylhexyl acrylate, and 82.36 g of acetoacetoxyethyl methacrylate was begun at 8.38 g/min. Five minutes after the first emulsion feed was begun, an initial solution composed of 1.04 g dissolved in 26.8 g of water was fed at 0.536 g/min. Five minutes after the monomer feed, an initiator solution of 0.32 g of t-butyl hydroperoxide, and 0.32 g of sodium formaldehyde sulfoxylate dissolved in 9.6 g of water was charged and heating continued for 30 minutes. The emulsion was cooled to 30° C., and 139.58 g of poly(ethylenimine) (50% in water) were pumped in over 15 minutes. Mole ratio of N—H group to acetoacetoxy group was 4.00. The latex was then filtered through 100 mesh wire screen. Solids level, 42.8; pH, 10; amount of dried material (100 mesh screen), 0.10 g; particle size (Dw), 54 nm. Infrared analysis of clear films cast over ZnSe showed an absorption at 1653 cm$^{-1}$ and 1592 cm$^{-1}$ and a disappearance of the absorbencies at 1631 cm$^{-1}$ and 1655 cm$^{-1}$ after addition of the poly(ethylenimine). After reacting the poly(ethylenimine) with the pendant acetoacetoxy group, the latex was centrifuged and the water phase analyzed. Elemental analysis of the water phase showed at most 1% of the poly(ethylenimine) remained in the water phase.

EXAMPLE 10

Preparation of Large Core/Shell Allyl/ Acetoacetoxy-Containing Waterborne Particles To a 3000 mL resin kettle equipped with a condenser, nitrogen purge, and subsurface feed tube were added 529.6 g of water, 2.87 g of TREM LF-40, 1.36 g of TERGITOL NP-40 (70%), 7.1 g of sodium carbonate, 5.01 g of methyl methacrylate, 28.95 g of styrene, 17.54 g of methyl methacrylate, 33.78 g of 2-ethylhexyl acrylate, and 0.16 g of trimethylolpropane triacrylate. A nitrogen purge was begun, then the contents of the reactor brought up to 80° C. at 400 rpm. After reaching 80° C., an initiator solution composed of 5.28 g of sodium persulfate dissolved in 20.88 g of water was added to the reactor. An initiator solution composed of 3.56 g of sodium persulfate dissolved in 53.77 g of water was fed into the reactor at 0.336 g/min. Ten minutes after the initiator feed was started, an emulsion feed composed of 192.6 g of water, 8.31 g of TREM LF-40, 7.25 g of TERGITOL NP-40 (70%), 107.72 g of methyl methacrylate, 177.89 g of styrene, 207.54 g of 2-ethylhexyl acrylate, and 0.98 g of trimethylolpropane triacrylate was begun at 5.25 g/min. After the first emulsion feed was completed, the lines were rinsed with 160 g of water, and heating continued. After 25 minutes, a second emulsion feed composed of 205 g of water, 15.73 g of AEROSOL 18, 6.12 g of TERGITOL NP-40 (70%), 251.8 g of styrene, 175.1 g of 2-ethylhexyl acrylate, 94.94 g of acetoacetoxyethyl methacrylate, 47.92 g of allyl methacrylate, 23.99 g of dimethylaminoethyl methacrylate, and 4.79 g of 2-ethylhexyl 3-mercaptopropionate was started at 8 g/minute. Ten minutes after the feeds were completed, an initiator solution composed of 1.34 g of sodium formaldehyde sulfoxylate and 1.34 g of t-butylhydroperoxide dissolved in 40.2 g of water was fed into the reactor over 15 minutes. The latex was then filtered through 100 mesh wire screen. Solids level, 47%; amount of dried material (100 mesh screen), 1.7 g.

EXAMPLE 11

Preparation of Small Core/Shell Amine-Containing Waterborne Particles

To a 3000 mL resin kettle equipped with a condenser, nitrogen purge, and subsurface feed tube were added 1100 g of water, 49 g of HITENOL HS-20, 8.05 g of TERGITOL NP-40 (70%), 7.3 g of sodium carbonate, 36.6 g of methyl methacrylate, 36.1 g of styrene, 36.2 g of 2-ethylhexyl acrylate, and 0.335 g of trimethylolpropane triacrylate. A nitrogen purge was begun, then the contents of the reactor brought up to 80° C. at 400 rpm. After reaching 80° C., an initiator solution composed of 7.05 g of sodium persulfate dissolved in 43.55 g of water was added to the reactor. An initiator solution composed of 4.36 g of sodium persulfate dissolved in 112 g of water was started at 0.466 g/min. Thirty minutes after the initiator feed was begun, an emulsion feed composed of 355 g of water, 19.65 g of AEROSOL 18, 20.19 g of TERGITOL NP-40 (70%), 224.84 g of methyl methacrylate, 221.95 g of styrene, 224.4 g of 2-ethylhexyl acrylate, and 2.06 g of trimethylolpropane triacrylate was begun at 5.24 g/min. After the first emulsion feed was completed, a second emulsion feed composed of 147 g of water, 12.15 g of AEROSOL 18, 12.48 g of TERGITOL NP-40 (70%), 168.6 g of styrene, 80 g of 2-ethylhexyl acrylate, and 167.9 g of acetoacetoxyethyl methacrylate was fed at 8.4 g/min. Ten minutes after the feeds were completed, an initiator solution composed of 1.34 g of sodium formaldehyde sulfoxylate and 1.34 g of t-butylhydroperoxide dissolved in 40.2 g of water was charged to the reactor and heating continued for 30 minutes. The emulsion was cooled to less than 35° C., and 283.84 g of polyethylenimine (50%) were pumped in over 15 minutes. The latex was then filtered through 100 mesh wire screen. Solids level, 41.8; amount of dried material (100 mesh screen), 0.60 g; pH, 10.5. Infrared analysis of clear films cast over ZnSe showed an absorption at 1565 cm$^{-1}$ which represents an enamine moiety.

EXAMPLE 12

Preparation of Large Unstructured Acetoacetoxy-Containing Waterborne Particles (Particle contains 12% AAEM)

To a 1000 mL resin kettle equipped with a condenser, nitrogen purge, and subsurface feed tube were added 294 g of water, 1.34 g of TREM LF-40, 1.79 g of TERGITOL NP-40 (100%), 2.044 g of sodium carbonate, 9.67 g of styrene, 6.09 g of 2-ethylhexyl acrylate, and 0.01 g of sodium 2-acrylamido-2-methylpropanesulfonate (50% in water). A nitrogen purge was begun, then the contents of the reactor brought up to 80° C. at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, an emulsion feed composed of 120 g of water, 9.94 g of AEROSOL 18, 7.16 g of TERGITOL NP-40 (100%), 186.6 g of styrene, 115.63 g of 2-ethylhexyl acrylate, 40.81 g of acetoacetoxyethyl methacrylate, and 0.52 g of sodium 2-acrylamido-2-methylpropanesulfonate (50% in water) was fed into the reactor at 1.72 g/min. Five minutes after the feeds were completed, then an initiator solution composed of 0.4 g of sodium persulfate and 0.4 g of sodium metabisulfite dissolved in 12 g of water was added to the reactor and heating continued for 30 minutes. The latex was then filtered through 100 mesh wire screen. Solids level, 42.6; amount of dried material (100 mesh screen), 0.20 g; particle size (Dw), 153 nm; Tg of Polymer, 14° C.

EXAMPLE 13

Preparation of Large Unstructured Acetoacetoxy-Containing Waterborne Particles (Particle contains 15% AAEM)

To a 1000 mL resin kettle equipped with a condenser, nitrogen purge, and subsurface feed tube were added 351 g of water, 0.76 g of AEROSOL OT, 5.11 g of TERGITOL NP-40 (100%), 2.05 g of sodium carbonate, 3.58 g of styrene, 11.63 g of 2-ethylhexyl acrylate, and 2.68 g of sodium 2-acrylamido-2-methylpropanesulfonate (50% in water). A nitrogen purge was begun, then the contents of the reactor brought up to 80° C. at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, a monomer feed composed of 4.10 g of AEROSOL OT (75%), 88.02 g of styrene, 221.06 g of 2-ethylhexyl acrylate, 51.01 g of acetoacetoxyethyl methacrylate, and 0.26 g of sodium 2-acrylamido-2-methylpropanesulfonate (50% in water) was fed into the reactor at 1.72 g/min. Five minutes after the feeds were completed, then an initiator solution composed of 0.4 g of sodium persulfate and 0.4 g of sodium metabisulfite dissolved in 12 g of water was added to the reactor and heating continued for 30 minutes. The latex was then filtered through 100 mesh wire screen. Solids level, 47.6; amount of dried material (100 mesh screen), 0.10 g; particle size (Dw), 122 nm; Tg of Polymer, −28° C.

EXAMPLE 14

Preparation of Large Unstructured Acetoacetoxy-Containing Waterborne Particles (Particle contains 7.5% AAEM)

To a 1000 mL resin kettle equipped with a condenser, nitrogen purge, and subsurface feed tube were added 294 g of water, 1.34 g of TREM LF-40, 1.79 g of TERGITOL NP-40 (100%), 2.044 g of sodium carbonate, 12.71 g of styrene, 3.84 g of isooctyl acrylate, and 0.014 g of sodium 2-acrylamido-2-methylpropanesulfonate (50% in water). A nitrogen purge was begun, then the contents of the reactor brought up to 80° C. at 400 rpm. After reaching 80° C., an initiator solution composed of 2.3 g of sodium persulfate dissolved in 13.0 g of water was added to the reactor. An initiator solution composed of 1.3 g of sodium persulfate dissolved in 34 g of water was fed into the reactor at 0.16 g/min. Ten minutes after the initiator feed was started, an emulsion feed composed of 120 g of water, 9.94 g of AEROSOL 18, 7.16 g of TERGITOL NP-40 (100%), 241.47 g of styrene, 73.02 g of isooctyl acrylate, 25.61 g of acetoacetoxyethyl methacrylate, and 0.52 g of sodium 2-acrylamido-2-methylpropanesulfonate (50% in water) was fed into the reactor at 1.72 g/min. Five minutes after the initiator feed was in, an initiator solution of 0.72 g of sodium formaldehyde sulfoxylate and 1.03 g of t-butylhydroperoxide dissolved in 12 g of water was added to the reactor. The latex was then filtered through 100 mesh wire screen. Solids level, 43.8; amount of dried material (100 mesh screen); 3.3 g; pH, 7.4; particle size (Dw), 151 nm; Tg of Polymer, 16° C.

EXAMPLE 15

Preparation of Large Core/Shell Amine-Containing Waterborne Particles (Particle contains 12% AAEM, Ratio N—H to Enamine, 3.6)

To a 1000 mL resin kettle equipped with a condenser, nitrogen purge, and subsurface feed tube were added 192 g of water, 1.22 g of TREM LF-40, 0.79 g of TERGITOL NP-40 (70%), 2.4 g of sodium carbonate, 13.55 g of methyl methacrylate, 1.21 g of styrene, 17.24 g of 2-ethylhexyl acrylate, 0.10 g of trimethylolpropane triacrylate, and 6.04 g of acetoacetoxyethyl methacrylate. A nitrogen purge was begun, then the contents of the reactor brought up to 80° C. at 400 rpm. After reaching 80° C., an initiator solution composed of 2.31 g of sodium persulfate dissolved in 13.06 g of water was added to the reactor. An initiator solution composed of 1.31 g of sodium persulfate dissolved in 34 g of water was started at 0.54 g/min. Thirty minutes after the initiator feed was begun, an emulsion feed composed of 106 g of water, 3.51 g of TREM LF-40, 3.06 g of TERGITOL NP-40 (70%), 83.23 g of methyl methacrylate, 7.44 g of styrene, 105.91 g of 2-ethylhexyl acrylate, and 0.619 g of trimethylolpropane triacrylate was begun at 8.38 g/min. After the first emulsion feed was completed, the feed lines were washed with 80 g of water, and the temperature held at 80° C. for 30 minutes. A second emulsion feed composed of 53 g of water, 3.84 g of AEROSOL 18, 1.53 g of TERGITOL NP-40 (70%), 63.31 g of styrene, 24.0 g of 2-ethylhexyl acrylate, 37.13 g of acetoacetoxyethyl methacrylate, and 0.50 g of the sodium 2-acrylamido-2-methylpropanesulfonate (50% in water) was fed at 8.38 g/min. Five minutes after the initiator solution feed was in, an initiator solution of 0.40 g of sodium formaldehyde sulfoxylate and 0.40 g of t-butylhydroperoxide dissolved in 12.1 g of water was added to the reactor. The emulsion was cooled to less than 35° C., and 69.51 g of polyethylenimine (50%) were pumped in over 15 minutes. The latex was then filtered through 100 mesh wire screen. Solids level, 46.6; amount of dried material (100 mesh screen), 0.15 g; particle size (Dw), 167 nm; Tg, 5° C.

EXAMPLE 16

Preparation of Large Core/Shell Amine-Containing Waterborne Particles (Particle contains 12% AAEM, Ratio N—H to Enamine, 1.1)

To a 1000 mL resin kettle equipped with a condenser, nitrogen purge, and subsurface feed tube were added 640 g of water, 4.05 g of TREM LF-40, 1.93 g of TERGITOL NP-40 (70%), 8.0 g of sodium carbonate, 55.23 g of methyl methacrylate, 4.04 g of styrene, 47.4 g of 2-ethylhexyl acrylate, 0.33 g of trimethylolpropane triacrylate, and 20.1 g of acetoacetoxyethyl methacrylate. A nitrogen purge was begun, then the contents of the reactor brought up to 80° C. at 400 rpm. After reaching 80° C., an initiator solution composed of 7.0 g of sodium persulfate dissolved in 43.6 g of water was added to the reactor. An initiator solution composed of 4.36 g of sodium persulfate dissolved in 122 g of water was started at 0.54 g/min. Thirty minutes after the initiator feed was begun, an emulsion feed composed of 355 g of water, 11.7 g of TREM LF-40, 10.21 g of TERGITOL NP-40 (70%), 399.3 g of methyl methacrylate, 24.78 g of styrene, 291.2 g of 2-ethylhexyl acrylate, and 2.06 g of trimethylolpropane triacrylate was begun at 8.38 g/min. After the first emulsion feed was completed, the feed lines were washed with 80 g of water, and the temperature held at 80° C. for 30 minutes. A second emulsion feed composed of 171 g of water, 12.79 g of AEROSOL 18, 5.09 g of TERGITOL NP-40 (70%), 211 g of styrene, 80.0 g of 2-ethylhexyl acrylate, 123.8 g of acetoacetoxyethyl methacrylate, and 1.68 g of the sodium 2-acrylamido-2-methylpropanesulfonate (50% in water) was fed at 8.38 g/min. Five minutes after the initiator solution feed was in, an initiator solution of 1.34 g of sodium formaldehyde sulfoxylate and 1.34 g of t-butylhydroperoxide dissolved in 40.2 g of water was added to the reactor. The emulsion was cooled to less than 35° C., and 121 g of polyethylenimine (50%) were pumped in over 15 minutes. The latex was then filtered through 100 mesh wire screen. Solids level, 46.6; amount of dried material (100 mesh screen), 25 g; particle size (Dw), 450 nm; Tg, 14° C.; pH, 10.4.

EXAMPLE 17

Preparation of Large Core/Shell Allyl/Acetoacetoxy-Containing Waterborne Polymer Latex To a 3000 mL resin kettle equipped with a condenser, nitrogen purge, and subsurface feed tube were added 480 g of water, 1.30 g of HITENOL HS-20, 1.08 g of TERGITOL 15-S-40 (100%), 5.84 g of sodium carbonate, 5.01 g of methyl methacrylate, 8.27 g of styrene, 9.63 g of 2-ethylhexyl acrylate, and 0.0689 g of trimethylolpropane triacrylate. A nitrogen purge was begun, then the contents of the reactor brought up to 80° C. at 400 rpm. After reaching 80° C., an initiator solution composed of 6.16 g of sodium persulfate dissolved in 34.84 g of water was added to the reactor. An initiator solution composed of 3.48 g of sodium persulfate dissolved in 89.8 g of water was fed into the reactor at 0.336 g/min. Ten minutes after the initiator feed was started, an emulsion feed composed of 210.4 g of water, 2.75 g of AEROSOL OT, 5.72 g of TERGITOL 15-S40 (100%), 95.21 g of methyl methacrylate, 157.23 g of styrene, 183.02 g of 2-ethylhexyl acrylate, and 1.31 g of trimethylolpropane triacrylate was begun at 5.25 g/min. After the first emulsion feed was completed, the lines were rinsed with 60 g of water, and heating continued. After 25 minutes, a second emulsion feed composed of 138 g of water, 8.74 g of AEROSOL 18, 2.85 g of TERGITOL 15-S-40 (100%), 225.8 g of styrene, 153.5 g of 2-ethylhexyl acrylate, 47.97 g of acetoacetoxyethyl methacrylate, 28.78 g of allyl methacrylate, 18.81 g of dimethylaminoethyl methacrylate, and 4.894 g of 2-ethylhexyl 3-mercaptopropionate was started at 8 g/minute. Ten minutes after the feeds were completed, the reactor was cooled to 65° C., then an initiator solution composed of 2.74 g of sodium formaldehyde sulfoxylate dissolved in 32.2 g of water, and 5.05 g of a catalyst solution composed of 0.5% iron (II) sulfate chelated with ethylenediamine tetracetic acid were added to the reactor. A solution of 2.94 g of t-butylhydroperoxide dissolved in 32.2 g of water was fed into the reactor over 15 minutes. The latex was then filtered through 100 mesh wire screen. Solids level, 46.9; pH, 7.6; amount of dried material (100 mesh screen), 2.0 g; particle size (Dw), 197 nm.

EXAMPLE 18

Preparation of Small Core/Shell Amine-Containing Waterborne Particles

To a 3000 mL resin kettle equipped with a condenser, nitrogen purge, and subsurface feed tube were added 720.4 g of water, 39.2 g of HITENOL HS-20, 1.08 g of TERGITOL 15-S-40 (100%), 5.84 g of sodium carbonate, 26.14 g of methyl methacrylate, 35.2 g of styrene, 26.4 g of 2-ethylhexyl acrylate, and 0.264 g of trimethylolpropane triacrylate. A nitrogen purge was begun, then the contents of the reactor brought up to 80° C. at 400 rpm. After reaching 80° C., an initiator solution composed of 6.16 g of sodium persulfate dissolved in 34.84 g of water was added to the reactor. An initiator solution composed of 2.08 g of sodium persulfate dissolved in 53.6 g of water was started at 0.336 g/min. Thirty minutes after the initiator feed was begun, an emulsion feed composed of 158.4 g of water, 15.72 g of AEROSOL 18, 11.00 g of TERGITOL 15-S-40 (100%), 110.4 g of methyl methacrylate, 148.7 g of styrene, 111.52 g of 2-ethylhexyl acrylate, and 1.12 g of trimethylolpropane triacrylate was begun at 5.24 g/min. After the first emulsion feed was completed, the feed lines were washed with 80 g of water, and the temperature held at 80° C. for 30 minutes. The reactor was then cooled to 65° C., and an initiator solution of 2.74 g of sodium formaldehyde sulfoxylate dissolved in 16 g of water, and 5.05 g of a catalyst solution composed of 0.5% iron (II) sulfate chelated with ethylenediamine tetracetic acid were added to the reactor. A second emulsion feed composed of 138.4 g of water, 9.72 g of AEROSOL 18, 6.99 g of TERGITOL 15-S-40 (100%), 191.90 g of styrene, 43.25 g of methyl methacrylate, 143.92 g of 2-ethylhexyl acrylate, 95.95 g of acetoacetoxyethyl methacrylate, and 9.45 g of the sodium 2-acrylamido-2-methylpropanesulfonate (50% in water) was fed at 5.24 g/min. A solution of 3.92 g of t-butylhydroperoxide dissolved in 32 g of water was fed into the reactor during the second emulsion feed at 0.14 g/min. After the t-butylhydroperoxide feed was completed, heating was continued for 30 minutes. The emulsion was cooled to less than 35° C., and 122 g of polyethylenimine (50%) were pumped in over 15 minutes. The latex was then filtered through 100 mesh wire screen. Solids level, 44.6; amount of dried material (100 mesh screen), 1.1 g; particle size (Dw), 54 nm; pH, 10.5. Infrared analysis of clear films cast over ZnSe showed an absorption at 1565 cm$^{-1}$ which represents an enamine moiety.

EXAMPLE 19

Preparation of a low pH blend using the Latexes from Examples 17 and 18

To 233.1 g of Example 18 were added with stirring 700 g of Example 17; pH, 10.5. While stirring the blend of Example 17 and 18, 25.2 g of ammonium bicarbonate (25% in water) was added. The pH was 9.2. Samples of this blend were stable at 60° C. for greater than 14 days.

EXAMPLE 20

Preparation of Small Core/Shell Acetoacetoxy-Containing Waterborne Polymer Latex To a 3000 mL resin kettle equipped with a condenser, nitrogen purge, and subsurface feed tube were added 720 g of water, 39.2 g of HITENOL HS-20, 1.54 g of TERGITOL NP-40 (70%), 5.84 g of ammonium bicarbonate, 26.14 g of methyl methacrylate, 35.2 g of styrene, 26.4 g of 2-ethylhexyl acrylate, and 0.264 g of trimethylolpropane triacrylate. A nitrogen purge was begun, then the contents of the reactor brought up to 80° C. at 400 rpm. After reaching 80° C., an initiator solution composed of 6.16 g of ammonium persulfate dissolved in 34.84 g of water was added to the reactor. An initiator solution composed of 2.08 g of ammonium persulfate dissolved in 53.6 g of water was started at 0.336 g/min. Thirty minutes after the initiator feed was begun, an emulsion feed composed of 153.6 g of water, 15.72 g of AEROSOL 18, 15.72 g of TERGITOL NP-40 (70%), 110.4 g of methyl methacrylate, 148.7 g of styrene, 111.52 g of 2-ethylhexyl acrylate, and 1.12 g of trimethylolpropane triacrylate was begun at 5.24 g/min. After the first emulsion feed was completed, the feed lines were washed with 80 g of water, and the temperature held at 80° C. for 30 minutes. The reactor was then cooled to 65° C., and an initiator solution of 2.74 g of sodium formaldehyde sulfoxylate dissolved in 16 g of water, and 5.05 g of a catalyst solution composed of 0.5% iron (II) sulfate chelated with ethylenediamine tetracetic acid were added to the reactor. A second emulsion feed composed of 138.4 g of water, 9.72 g of AEROSOL 18, 9.98 g of TERGITOL NP-40 (70%), 191.90 g of styrene, 45.6 g of methyl methacrylate, 143.92 g of 2-ethylhexyl acrylate, 95.95 g of acetoacetoxyethyl methacrylate, and 4.72 g of the sodium 2-acrylamido-2-methylpropanesulfonate (50% in water) was fed at 5.24 g/min. A solution of 3.92 g of t-butylhydroperoxide dissolved in 32 g of water was fed into the reactor during the second emulsion feed at 0.14 g/min. After the t-butylhydroperoxide feed was completed, heating was continued for 30 minutes. The latex was then filtered through 100 mesh wire screen. Solids level, 44.9; amount of dried material (100 mesh screen), 1.5 g; particle size (Dw), 72 nm.

EXAMPLE 21

Preparation of Small Core/Shell Amine-Containing Waterborne Polymer Latex

To a 400 mL resin kettle equipped with a condenser, nitrogen purge, and subsurface feed tube were added 900 g of water, 49 g of HITENOL HS-20, 1.93 g of TERGITOL NP-40 (70%), 7.3 g of sodium carbonate, 32.67 g of methyl methacrylate, 44 g of styrene, 33 g of 2-ethylhexyl acrylate, and 0.33 g of trimethylolpropane triacrylate. A nitrogen purge was begun, then the contents of the reactor brought up to 80° C. at 400 rpm. After reaching 80° C., an initiator solution composed of 7.70 g of sodium persulfate dissolved in 43.55 g of water was added to the reactor. An initiator solution composed of 2.61 g of sodium persulfate dissolved in 67 g of water was started at 0.42 g/min. Thirty minutes after the initiator feed was begun, an emulsion feed composed of 192 g of water, 19.65 g of AEROSOL 18, 19.65 g of TERGITOL NP-40 (70%), 138.01 g of methyl methacrylate, 185.88 g of styrene, 139.41 g of 2-ethylhexyl acrylate, and 1.394 g of trimethylolpropane triacrylate was begun at 6.56 g/min. After the first emulsion feed was completed, the feed lines were washed with 80 g of water, and the temperature held at 80° C. for 30 minutes. The reactor was then cooled to 65° C., and an initiator solution of 3.42 g of sodium formaldehyde sulfoxylate dissolved in 20 g of water, and 6.31 g of a catalyst solution composed of 0.5% iron (II) sulfate chelated with ethylenediamine tetracetic acid were added to the reactor. A second emulsion feed composed of 173 g of water, 12.15 g of AEROSOL 18, 12.48 g of TERGITOL NP-40 (70%), 239.88 g of styrene, 54.06 g of methyl methacrylate, 179.91 g of 2-ethylhexyl acrylate, 119.94 g of acetoacetoxyethyl methacrylate, and 11.81 g of the sodium 2-acrylamido-2-methylpropanesulfonate (50% in water) was fed at 6.56 g/min. A solution of 4.9 g of t-butylhydroperoxide dissolved in 40 g of water was fed into the reactor during the second emulsion feed at 0.14 g/min. After the t-butylhydroperoxide feed was completed, heating was continued for 30 minutes. The emulsion was cooled to less than 35° C., and 202.53 g of polyethylenimine (50%) were pumped in over 15 minutes. The latex was then filtered through 100 mesh wire screen. Solids level, 44.7; amount of dried material (100 mesh screen), 1.3 g; particle size (Dw), 56 nm; pH, 10.5.

EXAMPLE 22

Preparation of a low pH blend using the Latexes from Examples 20 and 21

To 234.6 g of Example 21 were added with stirring 700 g of Example 20; pH, 10.5. While stirring the blend of Example 20 and 21, 25.2 g of ammonium bicarbonate (25% in water) was added. The pH was 9.2. Samples of this blend were stable at 60° C. for greater than 14 days.

EXAMPLE 23

Preparation of Small Acetoacetoxy-containing 49/51 (w/w) Core/shell Polymer Particle Duplicate runs of Example 23 were prepared and blended to make a master batch. To a 3000 mL resin kettle equipped with a condenser, nitrogen purge, and subsurface feed tube were added 900.5 g of water, 49 g of HITENOL HS-20, 1.987 g of TERGITOL 15-S-40 (68%), 31.9 g of methyl methacrylate, 44 g of styrene, 33 g of 2-ethylhexyl acrylate, 1.1 g trimethylolpropane triacrylate, and 7.3 g of sodium carbonate. A nitrogen purge was begun, then the contents of the reactor brought up to 80° C. at 350 rpm. After reaching 80° C., an initiator charge composed of 7.54 g of sodium persulfate dissolved in 43.55 g of water was added to the reactor. An emulsion feed composed of 245.5 g of water, 19.65 g of AEROSOL 18, 20.23 g of TERGITOL 15-S-40, 134.76 g of methyl methacrylate, 185.88 g of styrene, 139.41 g of 2-ethylhexyl acrylate, and 4.647 g of trimethylolpropane triacrylate was begun at 5.248 g/min. Five minutes after the first emulsion feed was begun, an initiator solution composed of 4.26 g of sodium persulfate dissolved in 109 g of water was fed at 0.336 g/min. After the first emulsion feed was completed, the feed line was flushed with 20 g of water and the reaction was held at 80° C. for 30 minutes. Then a second emulsion feed composed of 169 g of water, 12.15 g of Aerosol 18, 12.85 g of TERGITOL 15-S-40, 239.68 g of styrene, 54.06 g of methyl methacrylate, 179.91 g of 2-ethylhexyl acrylate, 119.94 g of acetoacetoxyethyl methacrylate, 11.81 g of the sodium $^2$-acrylamido-2-methylpropanesulfonate (50% in water) and 6.12 g of Drewplus L-483 (a defoamer) was fed at 5.248 g/min. After the last feed, the reaction was held for 10 minutes at 80° C. then cooled to 65° C. over the next 20 minutes. Then the reactor was charged with a solution of 1 g of isoascorbic acid in 20 g water and 0.5 g of iron (II) sulfate. Over the next 30 minutes, a solution of 0.72 g of t-butyl hydroperoxide in 20 g of water was fed into the reactor while heating continued. The emulsion was cooled, and filtered through 100 mesh wire screen. For run 1: solids level, 44.59; amount of dried material (100 mesh screen), 2.49 g; For run 2: solids level, 44.97, amount of dried material (100 mesh screen), 1.81 g. The combined batches had a solids level of 44.53, a particle size of 71.0 nm (Dw) with a monomodal distribution.

EXAMPLE 24

Preparation of Large Acetoacetoxy-containing 65/35 (w/w) Core/shell Structured Polymer Particle Fourteen replicate runs of Example 24 were prepared and blended to make a master batch. The following preparation was used.

To a 3000 mL resin kettle equipped with a condenser, nitrogen purge, and subsurface feed tube were added 600.6 g of water, 1.62 g of HITENOL HS-20, 1.98 g of TERGITOL NP-40 (70%), and 7.3 g of sodium carbonate. A nitrogen purge was begun, then the contents of the reactor brought up to 80° C. at 400 rpm. After reaching 80° C., an initiator charge composed of 7.705 g of sodium persulfate dissolved in 43.55 g of water was added to the reactor. An emulsion feed composed of 355 g of water, 3.26 g of AERSOL OT-75 (75% in water), 10.51 g of TERGITOL 15-S-40 (70% in water), 382.85 g of methyl methacrylate, 111.38 g of styrene, 266.37 g of 2-ethylhexyl acrylate, and 1.75 g of trimethylolpropane triacrylate was begun at 4.59 g/min. Five minutes after the first emulsion feed was begun, an initiator solution composed of 4.36 g of sodium persulfate dissolved in 112.22 g of water was fed at 0.294 g/min. After the first emulsion feed was completed, the feed line was washed with 50 g of water and the reaction was held at 80° C. for 30 minutes. Then a second emulsion feed composed of 172.5 g of water, 10.93 g of AEROSOL 18, 5.27 g of TERGITOL 15-S-40, 178.31 g of styrene, 66.56 g of 2-ethylhexyl acrylate, 141.45 g of acetoacetoxyethyl methacrylate, and 1.68 g of the sodium 2-acrylamido-2-methylpropanesulfonate (50% in water) was fed at 7 g/min. After the last feed, the reaction was held for 10 minutes at 80° C. then cooled to 65° C. over the next 20 minutes. Then the reactor was charged with a solution of 1 g of isoascorbic acid in 20 g water and 0.72 g of iron (II) sulfate. Over the next 30 minutes, a solution of 0.72 g of t-butyl hydroperoxide in 20 g of water was fed into the reactor while heating continued. The emulsion was cooled, and filtered through 100 mesh wire screen.

The combined batches had a solids level of 46.74, a particle size of 254 nm (Dw) with a monomodal distribution. The particles appearance was the raspberry type by transmission electron microscopy. After blending, 5.116 g of PROXEL GL (biocide) was added to the masterbatch.

EXAMPLE 25

Preparation of Large Core/shell Amine-functional Particle from Example 24

To 2500 g of the latex of Example 24 were added over 15 minutes 72.52 g of LUPASOL G35 poly(ethylenimine) (50%). Total solids 46.66. Infrared analysis of clear films cast over ZnSe showed an absorption at 1653 cm$^{-1}$ and 1565 cm$^{-1}$ and a disappearance of the absorbencies at 1631 cm$^{-1}$ and 1655 cm$^{-1}$ after addition of the poly(ethylenimine).

EXAMPLE 26

Preparation of Large Acetoacetoxy-containing 6/25 (w/w) Core/shell Structured Polymer Particle To a 3000 mL resin kettle equipped with a condenser, nitrogen purse, and subsurface feed tube were added 600.6 g of water, 1.62 g of HITENOL HS-20, 1.98 g of TERGITOL NP-40 (70%), and 7.3 g of sodium carbonate. A nitrogen purge was begun, then the contents of the reactor brought up to 80° C. at 400 rpm. After reaching 80° C., an initiator charge composed of 7.705 g of sodium persulfate dissolved in 43.55 g of water was added to the reactor. An emulsion feed composed of 355 g of water, 3.44 g of AEROSOL OT-75 (75% in water), 10.51 g of TERGITOL 15-S049 (70% in water), 379.27 g of methyl methacrylate, 110.54 g of styrene, 266.62 g of 2-ethylhexyl acrylate, and 5.72 g of trimethylolpropane triacrylate was begun at 4.59 g/min. Five minutes after the first emulsion feed was begun, an initiator solution composed of 4.36 g of sodium persulfate dissolved in 112.22 g of water was fed at 0.294 g/min. After the first emulsion feed was completed, the feed line was washed with 50 g of water and the reaction was held at 80° C. for 30 minutes. Then a second emulsion feed composed of 172.4 g of water, 10.93 g of AEROSOL 18, 5.27 g of TERGITOL 15-S-40, 177.91 g of styrene, 66.56 g of 2-ethylhexyl acrylate, 141.87 g of acetoacetoxyethyl methacrylate, and 1.68 g of the sodium 2-acrylamido-2-methylpropanesulfonate (50% in water) was fed at 7 g/min. After the last feed, the reaction was held for 10 minutes at 80° C. then cooled to 65° C. over the next 20 minutes. Then the reactor was charged with a solution of 1 g of isoascorbic acid in 20 g of water and 0.72 g of 0.5% iron (II) sulfate. Over the next 30 minutes, a solution of 0.72 g of t-butyl hydroperoxide (70% in water) in 20 g of water was fed into the reactor while heating continued. The emulsion was cooled; and filtered through 100 mesh wire screen. Dried solids collected on 100 mesh screen=1.72 g. Total solids level of 47.57%, and a particle size of 252 nm (Dw) with a monomodal distribution. The particles appearance was the raspberry type by transmission electron microscopy.

EXAMPLE 27

Preparation of 50/50 (w/w) Small Core/shell Structured Amine-functional Particle To a 3000 mL resin kettle equipped with a condenser, nitrogen purse, and subsurface feed tube were added 600.6 g of water, 1.62 g of HITENOL HS-20, 1.98 g of TERGITOL NP-40 (70%), and 7.3 g of sodium carbonate. A nitrogen purge was begun, then the contents of the reactor brought up to 80° C. at 400 rpm. After reaching 80° C., an initiator charge composed of 7.54 g of sodium persulfate dissolved in 43.55 g of water was added to the reactor. An emulsion feed composed of 246.5 g of water, 19.65 g of AEROSOL 18, 20.23 g of TERGITOL 15-S-40 (70% in water), 134.76 g of methyl methacrylate, 185.88 g of styrene, 139.41 g of 2-ethylhexyl acrylate, and 4.647 g of trimethylolpropane triacrylate was begun at 5.248 g/min. Five minutes after the first emulsion feed was begun, an initiator solution composed of 4.26 g of sodium persulfate dissolved in 109 g of water was fed at 0.336 g/min. After the first emulsion feed was completed, the feed line was washed with 20 g of water and the reaction was held at 80° C. for 30 minutes. Then a second emulsion feed composed of 169 g of water, 12.15 g of Aerosol 18, 12.85 g of TERGITOL 15-S-40 (68% in water), 239.68 g of styrene, 54.06 g of methyl methacrylate, 179.91 g of 2-ethylhexyl acrylate, 119.94 g of acetoacetoxyethyl methacrylate, and 11.81 g of the sodium 2-acrylamido-2-methylpropanesulfonate (50% in water) was fed at 7 g/min. After the last feed, the reaction was held for 10 minutes at 80° C. then cooled to 65° C. over the next 20 minutes. The reactor was then charged with a solution of 1 g of isoascorbic acid in 20 g of water and 0.72 g of 0.5% iron (II) sulfate. Over the next 30 minutes, a solution of 0.72 g of t-butyl hydroperoxide (70% in water) in 20 g of water was fed into the reactor while heating continued. The emulsion was cooled, then 244.97 g of Lupasol G35 poly)ethylenimine (50% in water) was fed into the emulsion and the emulsion was filtered through 100 mesh wire screen. Dried solids collected on 100 mesh screen=0.95 g. Total solids level of 44.77%.

EXAMPLE 28

Clear Coalescing Formulation Blend of Example 26 with 27

The latexes of Examples 26 and 27 were made into a clear coalescing blend formulation as shown on the table below. The solvent blend was composed of 52.8 g of TEXANOL ester alcohol mixed with 47.2 g of EASTMAN DM. Additional TERGITOL 15-S-40 was added to make the latex blend stable to the solvent blend. The clear formula below was allowed to equilibrate at least 24 hours before using.

TABLE 1

Clear Coalescing formulation for Example 28

| Ingredient: | Weight (grams): |
|---|---|
| Example 26 | 276.75 |
| Example 27 | 71.47 |
| TERGITOL 15-S-40 | 2.27 |
| 25% Ammonium Bicarbonate | 23.83 |
| Solvent Blend | 36.32 |
| pH | 8.09 |
| Viscosity | 25 |
| Onset/midpoint glass transition (Tg) ° C.: | 14/24 |

EXAMPLE 29

Preparation of a Water-based Latex

To a 1000 mL resin kettle equipped with a condenser, nitrogen purge, and subsurface feed tube were added 174 g of water, 14.67 g of HITENOL HS-20, 0.39 g of sodium carbonate, and 9.26 g of AEROSOL 18. An emulsion feed composed of 167 g of water, 18.56 g of n-propyl alcohol, 12.07 g of TERGITOL 15-S-40 (70%), 64.83 g of methyl methacrylate, 138.5 g of styrene, 102.4 g 2-ethylhexyl acrylate, 34.11 g of acetoacetoxyethyl methacrylate, and 3.41 g of a 50% aqueous solution of sodium 2-acrylamido-2-methylpropane sulfonate was prepared, of which 17.47 g were added to the reactor. A nitrogen purge was begun, and the reactor contents brought up to 65° C. at 400 rpm. After reaching 65° C., an initiator charge composed of 1.27 g of sodium metabisulfite in 6.3 g of water, 0.25 g of sodium persulfate in 2.69 g of water, and 2.71 g of a 0.5% aqueous solution of iron(II) sulfate was added to the reactor. After 15 minutes, the remainder of the emulsion feed was added to the reactor at a rate of 2.94 g/min. An initiator feed of 1.02 g of sodium persulfate and 1.20 g of sodium carbonate in 56.76 g of water was also begun at a rate of 0.32 g/min. Fifteen minutes after the monomer feed, a solution of 0.79 g of isoascrobic acid and 0.25 g of ammonium carbonate in 4.10 g of water was added slowly to the reactor. An initiator solution of 1.15 g of t-butyl hydroperoxide and 2.41 g of TERGITOL 15-S-40 (70%) in 6.49 g of water was then fed to the reactor over a period of 30 minutes. Fifteen minutes after this initiator feed, the emulsion was cooled, and 101.8 g of LUPASOL G35 polyethyleneimine (diluted to 40%) was added over 30 minutes. Following this addition, a solution of 26.04 g of ammonium bicarbonate in 112.5 g of water and 6.19 g of n-propyl alcohol was added to the emulsion over 30 minutes. The latex was then filtered through a 100 mesh wire screen.

EXAMPLE 30

Preparation of a Non-Acetoacetoxy-Functional Polymer

To a 2-liter, 3-necked, glass reactor equipped with an agitator, a reflux condenser and a nitrogen inlet was charged a solution consisting of 256.7 g de-ionized water, 2.0 g of surfactant (a 45% solution of Dowfax 2A1, sodium dodecyl diphenyloxide disulfonate available from Dow Chemical), 2.7 g of sodium persulfate, and 3.6 g of sodium bicarbonate. An aqueous solution was prepared containing 1.3 g of sodium persulfate in 17.6 g of de-ionized water. A monomer pre-emulsion was prepared containing 571.3 g of de-ionized water, 29.8 g of surfactant (a 45% solution of Dowfax 2A1), 670.7 g of 2-ethylhexyl acrylate, and 223.6 g of ethyl acrylate.

The reactor charge was heated to 82° C. under a nitrogen atmosphere, and 4% of the pre-emulsion was charged to the reactor. After 10 minutes, the aqueous and pre-emulsion mixtures were pumped into the reactor over a four-hour period. After completion of the feeds, the reactor was held at 82° C. for one hour, then cooled to room temperature. The product was a latex polymer having a pH of 7.2, a solids content of 50.2%, a particle size of 149 nm, and a glass transition temperature (Tg) of −49.2° C.

Two hundred gram portions of the above latex were formulated with 1.5 parts (100% active) Triton X-405 which has an HLB 17.9, as a 70% solution from Union Carbide) CAS #9002-93-1, NaOH to adjust the latex to pH 7, and 0.4 parts ALCOGUM 1228 thickener, which is an ammonium acrylate copolymer from ALCO Chemical Corporation.

Adhesive Applications and Test Methods

Determination of Shear Strength

Shear strength is determined in accordance with ASTM D3654-78, PSTC-7 and is a measure of the cohesiveness (internal strength) of an adhesive. ("PSTC" designates the Pressure Sensitive Tape Council). It is based on the time required for a static loaded tape sample to separate from a standard flat surface in a direction essentially parallel to the surface to which it has been affixed with a standard pressure. Each test is conducted on an adhesive coated strip applied to a standard stainless steel panel in a manner such that a three-quarter inch by three-quarter inch portion of the strip is in firm contact with the panel with one end portion of the strip being free. The steel panel, with coated strip attached, is held in a rack such that the panel forms an angle of 178° to 180° with the extended tape free end which is then tensioned by application of a force of 500 grams applied as a hanging weight from the free end of the test strip. The elapsed time required for each test strip to separate from the test panel is recorded as shear strength.

Determination of Rolling Ball Tack

Rolling ball tack is determined in accordance with PSTC-6 and is a measure of the capacity of an adhesive to form a bond with the surface of another material upon brief contact under virtually no pressure. The Rolling Ball Tack test is a method of quantifying the ability of an adhesive to adhere quickly to another surface. Each specimen is placed onto a rolling ball apparatus (available from Chemsultants International) with adhesive side up. A steel ball (7/16 inch diameter) is rolled at a 45 angle onto the adhesive side up specimen. The distance from the point where the ball initially contacts the adhesive to where it stops is measured in inches. The reported values are an average of 5 tests.

EXAMPLE 31

Preparation of a Pressure Sensitive Adhesive Composition

Part A: Control

With stirring, a mass of 1.0 g of Tergitol 15-S-40 was added to a mass of 100 g of the polymer composition of Example 30. The pH of the latex was 7.76 as received.

Part B

With stirring, a mass of 9.0 g of Part A was added to a mass of 1.0 g of the water-based latex of Example 29. The resulting sample (B in Table 2 below) was mixed overnight. Using a K-Coat automatic applicator equipped with a #5 RK Rod and operating at a speed setting of 2.5, each sample (A and B) was applied to oriented polypropylene film (Mobil, 100 LBW). The film was washed with acetone just prior to application. The samples were air dried overnight. The shear strength and rolling ball tack were measured using the methods discussed above, with the results shown in Table 2.

TABLE 2

Shear Strength and Rolling Ball Tack

| Sample | Shear Strength minutes | Rolling Ball Tack Inches |
|---|---|---|
| Part A: Control | 3.9 | 3.8 |
| Part B | 1178.2 | 5.6 |

The results demonstrate that a blend of a water-based latex of the present invention with a non-acetoacetoxy functional polymer demonstrates greatly improved shear strength while maintaining good rolling ball tack over the non-acetoacetoxy-functional polymer alone.

EXAMPLE 32

Preparation of a Laminating Adhesive Composition

Part A: Control

With stirring, a mass of 1.0 g of Tergitol 15-S-40 was added to a mass of 100 g of the polymer composition of Example 30. The pH of the latex was 7.76 as received.

Part B

With stirring, a mass of 8.0 g of Part A was added to a mass of 2.0 g of the water-based latex of Example 29. The resulting sample (B in Table 2 below) was mixed overnight. Using a K-Coat automatic applicator equipped with a #5 RK Rod and operating at a speed setting of 2.5, each sample (A and B) was applied to oriented polypropylene film (Mobil, 100 LBW). The film was washed with acetone just prior to application. The samples were air dried for 30 minutes. A piece of unwashed oriented polypropylene film was placed on the top of each sample. Each sample was rolled to effect lamination with a hand roller (HR-100 4.5 lbs. from Chemsultants International). The films were placed in a forced air oven at 100° C. for 5 minutes. The samples were aged overnight. The bond strength of each was determined using an Instron Tensile Tester, Model TM,(Drive BX, Low BY-2) using a 5 lb. cell. The results are shown in Table 3. The shear strength was measured as described above.

TABLE 3

Bond and Shear Strength

| Sample | Shear Strength minutes | Bond Strength Grams/inch |
|---|---|---|
| Part A: Control | 3.9 | 190 |
| Part B | >6902.0 | 553 |

The results demonstrate that a blend of a water-based latex of the present invention with a non-acetoacetoxy polymer demonstrates greatly improved shear strength and lamination bond strength over the non-acetoacetoxy-functional polymer alone.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

The claimed invention is:

1. An adhesive composition, comprising a mixture of
    (a) a water-based latex comprising
        (i) dispersed waterborne amino-functional polymer particles having a glass transition temperature (Tg) of greater than about 0° C.;
        (ii) dispersed waterborne acetoacetoxy-functional polymer particles having a glass transition temperature (Tg) of greater than about 0° C.; and
        (iii) water; and
    (b) a non-acetoacetoxy-functional polymer having a Tg of about 20° C. or lower, wherein said non-acetoacetoxy-functional polymer (b) is different than said amino-functional polymer (a)(i).

2. The adhesive composition of claim 1, wherein the amino-functional polymer (i) of water-based latex (a) is a polymeric (polyamino) enamine comprising the reaction product of a surfactant-stabilized acetoacetoxy-functional polymer and a poly(alkylenimine).

3. The adhesive composition of claim 1, wherein the amino-functional polymer (i) of water-based latex (a) is present from about 5 to about 50 weight percent based on dry resin and the acetoacetoxy-functional polymer (ii) of water-based latex (a) is present from about 75 to about 90 weight percent based on dry resin.

4. The adhesive composition of claim 1, wherein the non-acetoacetoxy-functional polymer (b) has a Tg of about −20° C. to about 20° C.

5. The adhesive composition of claim 1, wherein the non-acetoacetoxy-functional polymer (b) has a Tg of less than about 0° C.

6. The adhesive composition of claim 5, wherein the non-acetoacetoxy-functional polymer (b) has a Tg of less than about −20° C.

7. The adhesive composition of claim 1, comprising from about 2% to about 50% of the water-based latex (a) based on the combined weight of the water-based latex (a) and the non-acetoacetoxy functional polymer (b).

8. The adhesive composition of claim 1, wherein the acetoacetoxy-functional polymer (ii) of water based latex (a) has enamine-functional groups and allyl-functional groups.

9. The adhesive composition of claim 1, wherein the acetoacetoxy-functional polymer (ii) of water based latex (a) is an enamine-functional polymer.

10. The adhesive composition of claim 1, wherein the acetoacetoxy-functional polymer (ii) of water-based latex (a) comprises
    about 1 to about 40 weight percent of a monomer of Formula (1):

$$R^1-CH=C(R^2)C(O)-X^1-X^2-X^3-C(O)-CH_2-C(O)-R^3 \quad (1)$$

where $R^1$ is hydrogen or halogen;
$R^2$ is a hydrogen, halogen, $C_1$–$C_6$ alkylthio group, or $C_1$–$C_6$ alkyl group;
$R^3$ is a $C_1$–$C_6$ alkyl group;

$X^1$ and $X^3$ are independently O, S, or a group of the formula

—N(R')—, in which R' is a $C_1$–$C_6$ alkyl group;
$X^2$ is a $C_1$–$C_{12}$ alkylene group or $C_3$–$C_{12}$ cycloalkylene group;

about 0.1 to about 10 weight percent of a non-self-polymerizing, surface-active vinyl monomer; and about 75 to about 90 weight percent of a non-acid vinyl monomer.

11. The adhesive composition of claim 10, wherein the monomer of Formula (1) is selected from the group consisting of acetoacetoxyethyl methacrylate, acetoacetoxyethyl acrylate, acetoacetoxy(methyl)ethyl acrylate, acetoacetoxypropyl acrylate, and acetoacetoxybutyl acrylate and the non-self-polymerizing, surface-active vinyl monomer is a polyoxyethylene alkyl phenyl

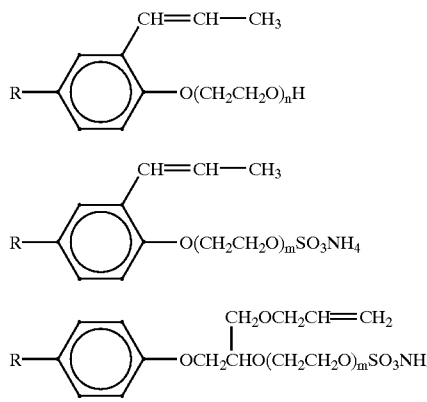

where R is nonyl or octyl, n ranges from 15 to 50, and m ranges from 15 to 40.

12. The adhesive composition of claim 1, wherein the non-acetoacetoxy functional polymer (b) is selected from the group consisting of polyester-amides, alkyds, polyurethanes, polyamides, acrylics, vinyl polymers, polymers having pendant allyl groups, styrene-butadiene polymers, vinylacetate-ethylene copolymers, and mixtures thereof.

13. The adhesive composition of claim 12, wherein the non-acetoacetoxy functional polymer is an acrylic or a vinyl acrylic polymer.

14. A method for laminating a first substrate to a second substrate comprising applying an adhesive composition to a surface of the first substrate and pressing the surface of the first substrate against the second substrate, wherein the adhesive composition comprises a mixture of (a) a water-based latex comprising
(i) dispersed waterborne amino-functional polymer particles having a Tg of greater than about 0° C.,
(ii) dispersed waterborne acetoacetoxy-functional polymer particles having a Tg of greater than about 0° C., and
(iii) water; and (b) a non-acetoacetoxy functional polymer having a Tg of about 20° C. or lower.

15. The method of claim 14, wherein the first substrate and second substrate are selected from the group consisting of polypropylene, polyethylene, polyethylene terephthalate, and polyvinyl chloride.

16. A method for laminating a first substrate and a second substrate comprising passing the first and second substrates through a two roll nip having an opening and injecting an adhesive composition at the nip opening towards the first substrate and/or the second substrate, wherein the adhesive composition comprises a mixture of (a) a water-based latex comprising
(i) dispersed waterborne amino-functional polymer particles having a Tg of greater than about 0° C.,
(ii) dispersed waterborne acetoacetoxy-functional polymer particles having a Tg of greater than about 0° C., and
(iii) water; and (b) a non-acetoacetoxy functional polymer having a Tg of about 20° C. or lower.

17. A method of making a substrate bearing a coating of a pressure sensitive adhesive on at least one surface thereof comprising applying an adhesive composition to a surface of the substrate, wherein the adhesive composition comprises a mixture of (a) a water-based latex comprising
(i) dispersed waterborne amino-functional polymer particles having a Tg of greater than about 0° C.,
(ii) dispersed waterborne acetoacetoxy-functional polymer particles having a Tg of greater than about 0° C., and
(iii) water; and (b) a non-acetoacetoxy functional polymer having a Tg of about 0° C. or lower.

18. The method of claim 17, wherein the substrate is selected from the group consisting of polypropylene, polyethylene, polyethylene terephthalate, and polyvinyl chloride.

19. A method of making an adhesive composition with improved shear and/or cohesion properties, comprising: adding to a polymer composition an effective amount of a water-based latex comprising (i) dispersed waterborne amino-functional polymer particles having a Tg of greater than about 0° C.;
(ii) dispersed waterborne acetoacetoxy-functional polymer particles having a Tg of greater than about 0° C.; and
(iii) water.

20. The method of claim 19, wherein the amino-functional polymer (i) is a polymeric (polyamino) enamine comprising the reaction product of a surfactant-stabilized acetoacetoxy-functional polymer and a poly(alkylenimine).

21. The adhesive composition of claim 1, wherein the ratio of latex (a) to non-acetoacetoxy-functional polymer (b) ranges from about 1:10 to about 4:1.

* * * * *